United States Patent
Mori

[11] Patent Number: 6,160,633
[45] Date of Patent: *Dec. 12, 2000

[54] CODE PRINTING APPARATUS FOR PRINTING AN OPTICALLY READABLE CODE IMAGE AT SET POSITIONS ON A PRINT MEDIUM

[75] Inventor: Takeshi Mori, Machida, Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/902,896

[22] Filed: Jul. 30, 1997

[30] Foreign Application Priority Data

Aug. 7, 1996 [JP] Japan .................... 8-208196

[51] Int. Cl.⁷ .................................................. G06F 15/00
[52] U.S. Cl. .......................................... 358/1.5; 358/1.18
[58] Field of Search ................................... 395/105, 106, 395/117, 101; 382/183; 235/462, 470; 707/521, 517, 104; 379/88.13, 88.14, 88.15, 908, 910; 347/107; 101/481; 345/339, 342, 326; 358/1.5, 1.6, 1.18, 1.1, 1.2, 1.9, 1.11, 1.12, 1.13, 1.14, 1.15

[56] References Cited

U.S. PATENT DOCUMENTS

| | | | |
|---|---|---|---|
| 4,760,606 | 7/1988 | Lesnick et al. | 382/306 |
| 4,876,570 | 10/1989 | Iwaya | 399/14 |
| 5,227,893 | 7/1993 | Ett | 358/400 |
| 5,337,668 | 8/1994 | Matsuoka et al. | 101/481 |
| 5,393,962 | 2/1995 | Konishi et al. | 235/375 |
| 5,448,696 | 9/1995 | Shimada et al. | 345/357 |
| 5,513,254 | 4/1996 | Markowitz | 379/100.17 |
| 5,617,528 | 4/1997 | Stechmann et al. | 345/326 |
| 5,689,718 | 11/1997 | Sakurai et al. | 707/517 |
| 5,696,365 | 12/1997 | Ukai et al. | 235/375 |
| 5,737,559 | 4/1998 | Orton et al. | 345/344 |
| 5,737,665 | 4/1998 | Sugiyama et al. | 399/39 |
| 5,748,807 | 5/1998 | Lopresti et al. | 382/310 |
| 5,751,575 | 5/1998 | Hirosawa et al. | 364/188 |
| 5,852,684 | 12/1998 | Lopresti et al. | 382/309 |

FOREIGN PATENT DOCUMENTS

| | | |
|---|---|---|
| 06670555A1 | 6/1995 | European Pat. Off. . |
| 0 670 555 A1 | 9/1995 | European Pat. Off. . |
| 7-099581 | 4/1995 | Japan . |
| 8-154177 | 6/1996 | Japan . |

*Primary Examiner*—Dov Popovici
*Attorney, Agent, or Firm*—Frishauf, Holtz, Goodman, Langer & Chick, P.C.

[57] ABSTRACT

A dot code generator receives multimedia information to be coded and generates a dot code. A medium size detector detects a size of a print sheet on the basis of print information. A print position setting unit stores information on dot code print positions in accordance with various medium sizes, and delivers the information to a system controller. The system controller determines the dot code print position corresponding to the size of the print sheet detected by the medium size detector, on the basis of the information input from the print position setting unit, and edits and synthesizes the dot code generated by the dot code generator and sheet print information delivered from a personal computer. The synthesized information is printed out by a printer.

14 Claims, 34 Drawing Sheets

POSITION, WHERE TWO BLACK PORTIONS WITH MORE THAN PREDETERMINED WHITE PORTION ARE PRESENT IMMEDIATELY AFTER MORE THAN PREDETERMINED BLACK PORTION, IS DETERMINED TO BE CORNER

LINE WIDTH IS SET TO CROSS ENTIRE MAIN-SCAN LINE FROM END TO END EVEN IF MAIN-SCAN LINE IS INCLINED

CODE PRINTING APPARATUS FOR PRINTING AN OPTICALLY READABLE CODE IMAGE AT SET POSITIONS ON A PRINT MEDIUM

BACKGROUND OF THE INVENTION

The present invention relates to a code printing apparatus and a code printing medium applied to the same. The code printing apparatus prints and records, on a printing medium such as paper, so-called multimedia information as an optically readable code pattern image. The multimedia information includes audio information such as speeches and music, image information obtained from a camera, a video recorder, etc., and text data obtained from a personal computer, word processor, etc.

Conventionally, various media such as a magnetic tape or an optical disk are known as media for recording audio information such as speeches and music. Even if these media are mass-produced, the price per unit is relatively high and the space necessary for storing the media is large. A great amount of labor and time is needed when a medium recording speeches is sent to a specified person by mail or brought to him/her directly. The same applies to the case of sending so-called multimedia information including image information obtained from a camera, a video device, etc. and text data obtained from a personal computer, a word processor, etc.

In order to solve this problem, the assignee of the present invention proposes a recording system and a reproducing system in EP 0,670,551 A1 (corresponding to U.S. Ser. No. 08/407,018). This recording system records multimedia information on an information recording medium such as paper in the form of a dot code in which dots are arranged two-dimensionally as image information or coded information which permits facsimile transmission and inexpensive mass-duplication, and the reproducing system reproduces the multimedia information recorded in the form of the dot code.

FIG. 1 shows a dot code 10 disclosed in the aforementioned EP 0,670,555 A1. According to the data format of dot code 10, one block 12 comprises a marker 14, a block address 16, address error detection/correction data 18 and a data area 20. Data dots 22 corresponding to actual data are recorded on the data area 20. The dot code 10 is produced in the form of an image in which such blocks 12 are arranged two-dimensionally in a matrix.

The aforementioned EP 0,670,555 A1 discloses that the dot code 10 is read and reproduced by a pen-type information reproducing device. This document also discloses a method of printing out synthesis information by means of a printer, etc., by synthesizing code image multimedia information and non-code image information of characters and pictures scanned by the pen-type information reproducing device serving as a scanner.

Specifically, as shown in FIG. 2, multimedia information such as characters or pictures printed on a paper sheet 24 is read by a pen-type information reproducing device 26 and input to an output process unit 28. In the output process unit 28, the input multimedia information is separated into components, i.e. image data, graph data and character data, and the respective information components are extended by extension process units 32, 34 and 36. The extended image data and graph data is interpolated by data interpolation units 38 and 40, and the interpolated image and graph data is supplied to a synthesis circuit 42. The extended character data is subjected to a PLD (Page Description Language) process in a PLD process unit 44, and the resultant character data is input to the synthesis circuit 42. The synthesis circuit 42 synthesizes the image, graph and character data, and the synthesized data is stored in a memory 46. The data stored in the memory 46 is read out according to address data delivered from an address control unit 48. The read-out data is supplied to an output unit 54 via an interpolation unit 50 and a D/A converter 52. In the output unit 54, an edit monitor 56 displays the supplied data. Thus, the user is able to confirm the data which is actually output.

The data read out from the memory 46 is also input to a synthesis unit 58. On the other hand, multimedia information read out by the pen-type information reproducing device 26 is converted to a dot code in a coding unit 60. The converted dot code is output-interpolated in an output adaptive interpolation unit 62 so as to be adaptive to the resolution of an output device 64 such as a printer or a copying machine. The interpolated dot code is delivered to the synthesis unit 58. Thus, the synthesis unit 58 synthesizes the data from the memory 46 and the data from the output adaptive interpolation unit 62. In other words, the dot code is added to the characters and/or pictures and the combined data is output to the printer or copying machine of the output unit 54 via an interface (I/F) 66.

An output selector 68 provides the output adaptive interpolation unit 62 with information on the resolution of the output device 64 such as the printer or copying machine. When the output device 64 such as the printer or copying machine is connected to the output process unit 28 and the model type thereof is identified, the resolution of the output device 64 is automatically determined. In the case where data is input to the output device 64 such as the printer or copying machine in an off-line manner by using a floppy disk, etc., the model type of the output device 64 is not determined. In such a case, the user switches the resolution manually.

In the above structure, the information of characters or pictures, other than the dot code, is printed out or copied as it is, and the dot code is output while it is matched with the resolution of the medium to be output.

Although the aforementioned document discloses the technique wherein the information, such as characters and pictures, other than the code image, and the multimedia information represented by the code image are synthesized and printed out by means of the printer, etc., it is silent on concrete means for actually specifying the layout of the information other than the dot code and the dot code itself in the synthesis unit 58.

The problem of the actual layout of the information, other than the dot code, and the dot code itself also arises in a code printing apparatus which does not use the pen-type information reproducing device 26.

BRIEF SUMMARY OF THE INVENTION

The present invention has been made in consideration of the above circumstances, and its object is to provide a code printing apparatus capable of efficiently arranging information, other than a code image such as ordinary characters or pictures, and multimedia information formed as a code image, and printing and recording both information on a print medium, and also to provide a code print medium applied to the code printing apparatus.

According to an aspect of the present invention, there is provided a code printing apparatus comprising:

input means for inputting multimedia information including at least one of audio information, video information and digital code data;

code image generating means for converting the multimedia information input by the input means to an optically readable code image;

printing means for optically readably printing the code image, generated by the code image generating means, on a predetermined print medium; and print position setting means for setting a print position of the code image on the print medium, which code image is to be printed by the printing means.

According to another aspect of the present invention, there is provided a code print medium applied to a code printing apparatus comprising: input means for inputting multimedia information including at least one of audio information, video information and digital code data; code image generating means for converting the multimedia information input by the input means to an optically readable code image; printing means for optically readably printing the code image, generated by the code image generating means, on a predetermined print medium; and print position setting means for setting a print position of the code image on the print medium, which code image is to be printed by the printing means, said medium comprising:

a code image print area which is to be set by the print position setting means on the print medium; and instruction information for instructing a position of the code image print area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Embodiments of the present invention will be described below.

[First Embodiment]

Figure 1:
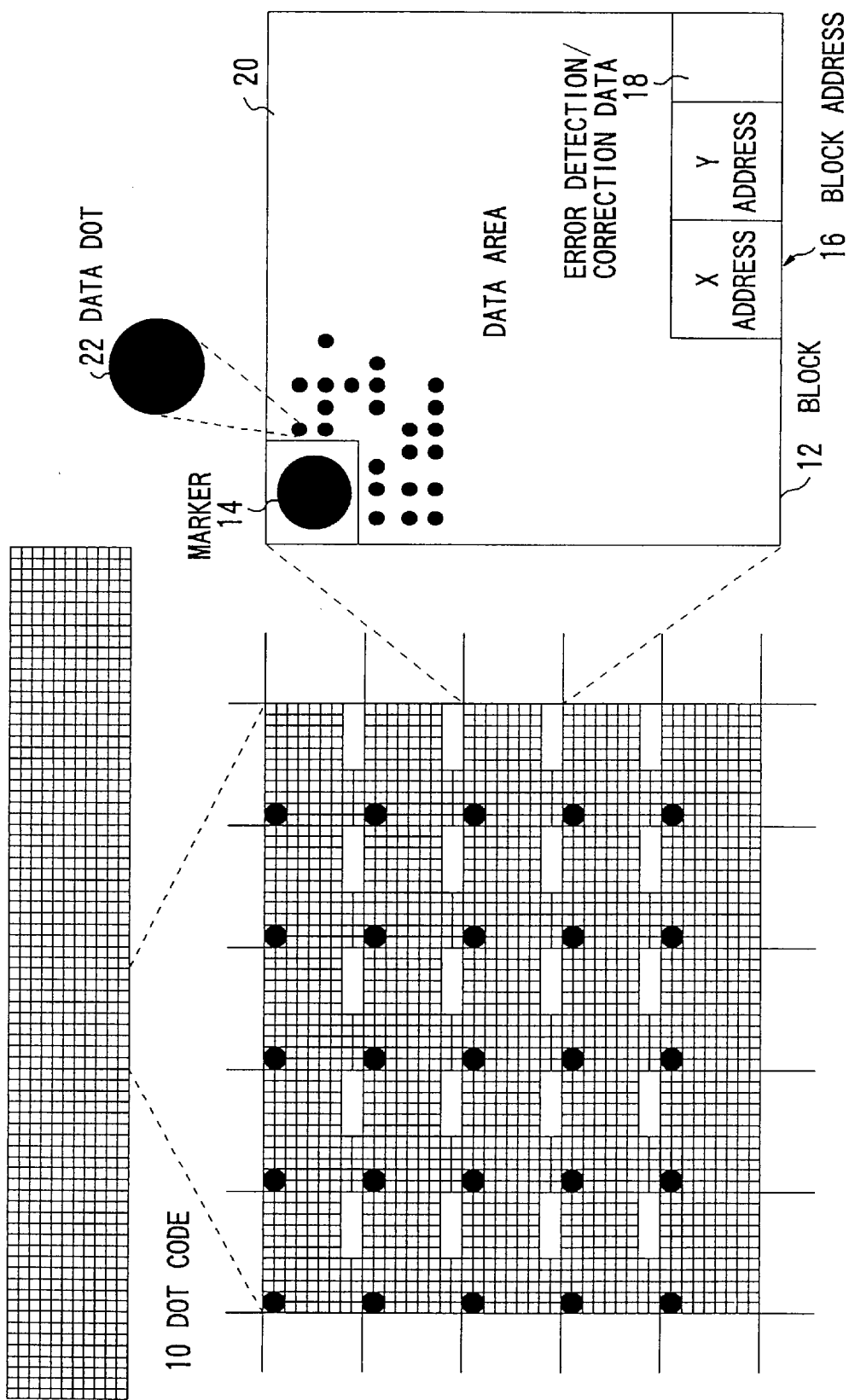
FIG. 1 shows a format of a dot code applied to the present invention.
Figure 2:
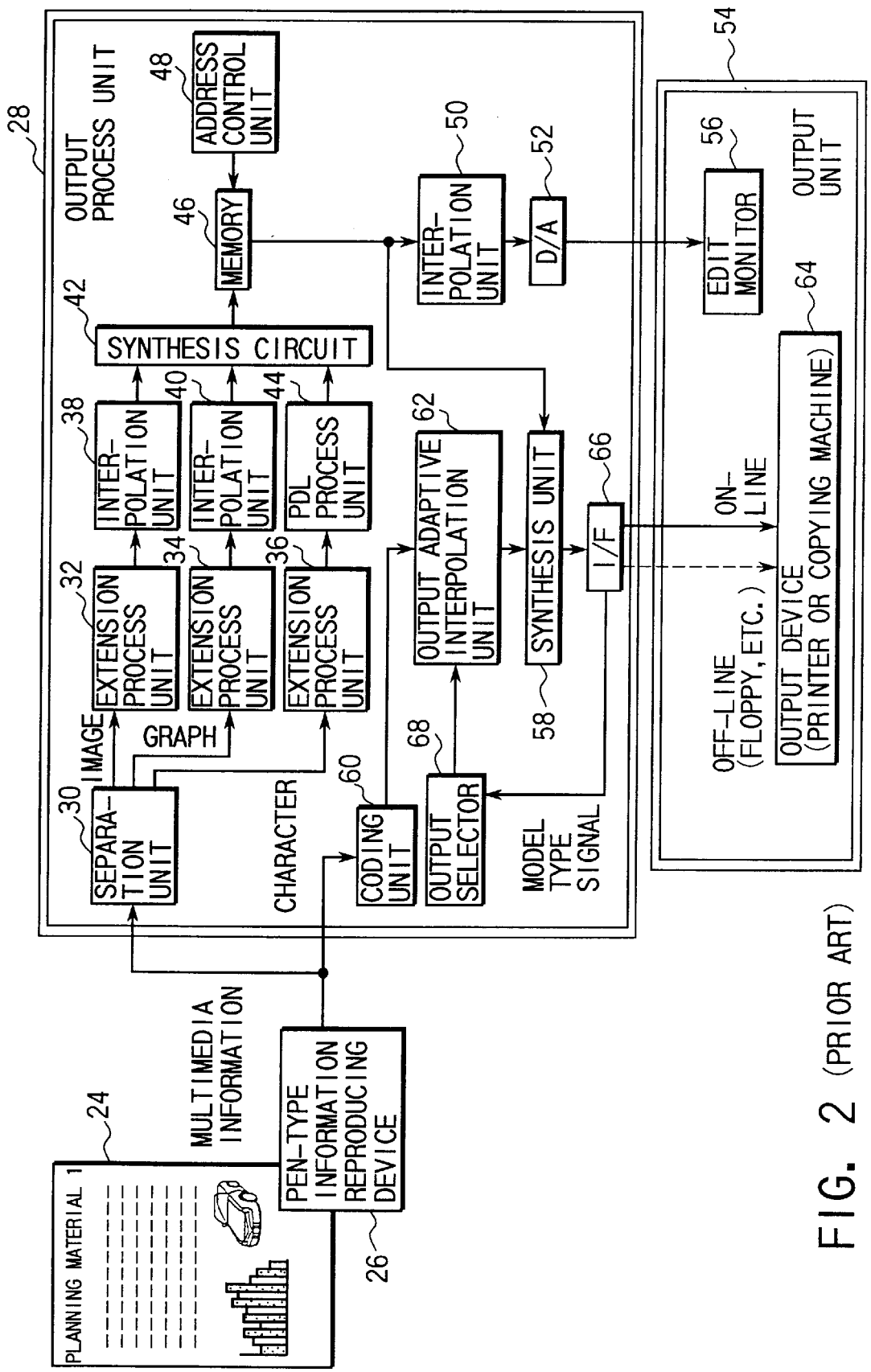
FIG. 2 shows the structure of a conventional code recording apparatus.
Figure 3:
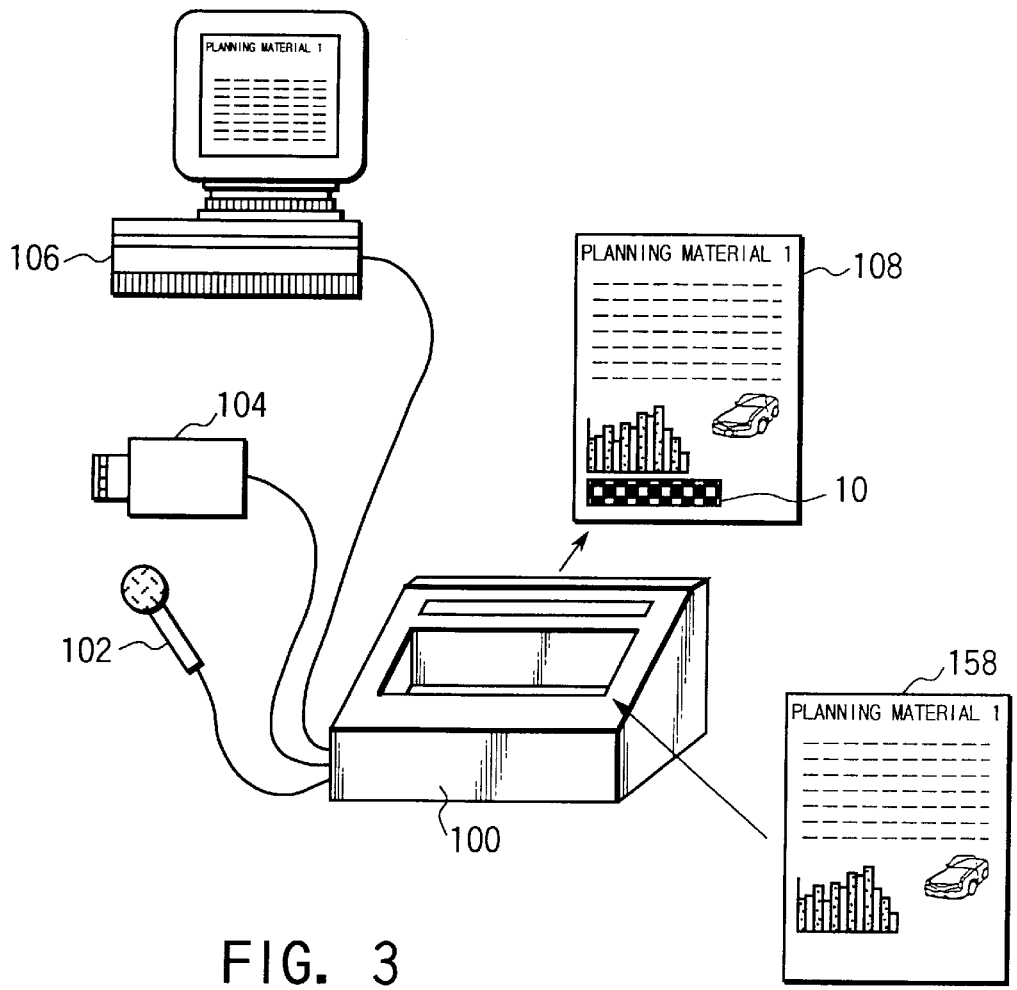
FIG. 3 shows an external appearance of a code printing apparatus according to a first embodiment of the present invention.

FIG. 3 shows an external appearance of a code printing apparatus 100 according to a first embodiment of the present invention. The code printing apparatus 100 is connected to multimedia information input units, i.e. a microphone 102 for inputting audio information, a video camera 104 for inputting video information, and a personal computer (PC) 106 for inputting digital code data. In the code printing apparatus 100, multimedia information input from the input units is converted to a dot code, and the dot code, along with sheet print information such as characters or pictures from the PC 106, is printed on a print paper sheet. Thus, a print output medium 108 is obtained.

Figure 4:
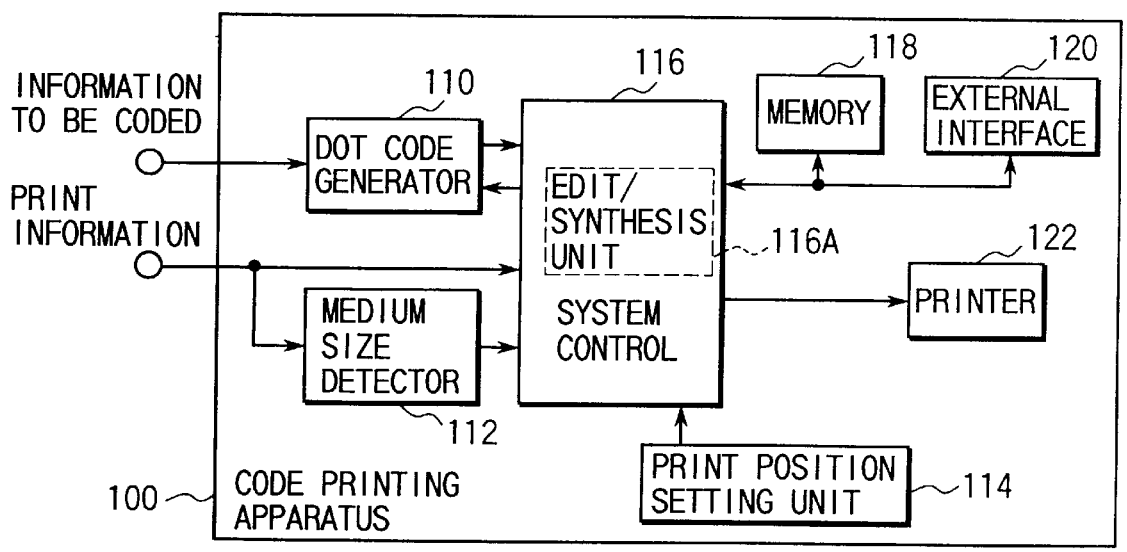
FIG. 4 is a block diagram of the code printing apparatus according to the first embodiment.

FIG. 4 is a block diagram showing the structure of this code printing apparatus 100. The code printing apparatus includes a dot code generator 110, a medium size detector 112, a print position setting unit 114, a system controller 116, a memory 118, an external interface 120 and a printer 122.

The dot code generator 110 receives multimedia information to be converted to a code image and supplies the multimedia information to the system controller 116. In this case, various parameters such as compressibility, which are required to generate the dot code, are supplied from the system controller 116.

The medium size detector 112 detects the size of the print output medium 108 or printing paper, on the basis of attributive information, such as format setting information, which accompanies sheet print information delivered from the personal computer 106. Alternatively, the medium size detector 112 detects, by means of a switch (not shown), the size of print paper set on the code printing apparatus 100.

The print position setting unit 114 stores data on print positions of the dot code corresponding to various sizes of the medium, and delivers this data to the system controller 116.

The system controller 116 controls the entire code printing apparatus 100. The system controller 116 has an edit/synthesis unit 116A. The edit/synthesis unit 116A determines, on the basis of information input from the print position setting unit 114, the print position of the dot code corresponding to the size of the print sheet detected by the medium size detector 112, and edits and synthesizes the dot code generated by the dot code generator 110 and the sheet print information supplied from the personal computer 106.

The memory 118 stores control programs of the system controller 116, etc. and temporarily stores the edited and synthesized print information.

The external interface 120 serves as an interface with the personal computer 106, etc. The external interface 120 receives digital code data to be converted to a dot code, among the sheet print information, and delivers the digital code data to the dot code generator 110 via the system controller 116. The external interface 120 can also transmit the edited/synthesized print information stored in the memory 118 to the personal computer 106, etc., thereby to store the print information into an external storage medium such as a floppy disk (not shown).

The printer 122 prints out the edited/synthesized print information stored in the memory 118 on a print paper sheet, thus obtaining a print output medium 108.

An example of the dot code generator 110 is disclosed in EP 0,670,555 A1 (U.S. Ser. No. 08/407,018, now U.S. Pat. No. 5,896,403, issued Apr. 4, 1999) filed by the assignee of the present invention.

Figure 5:
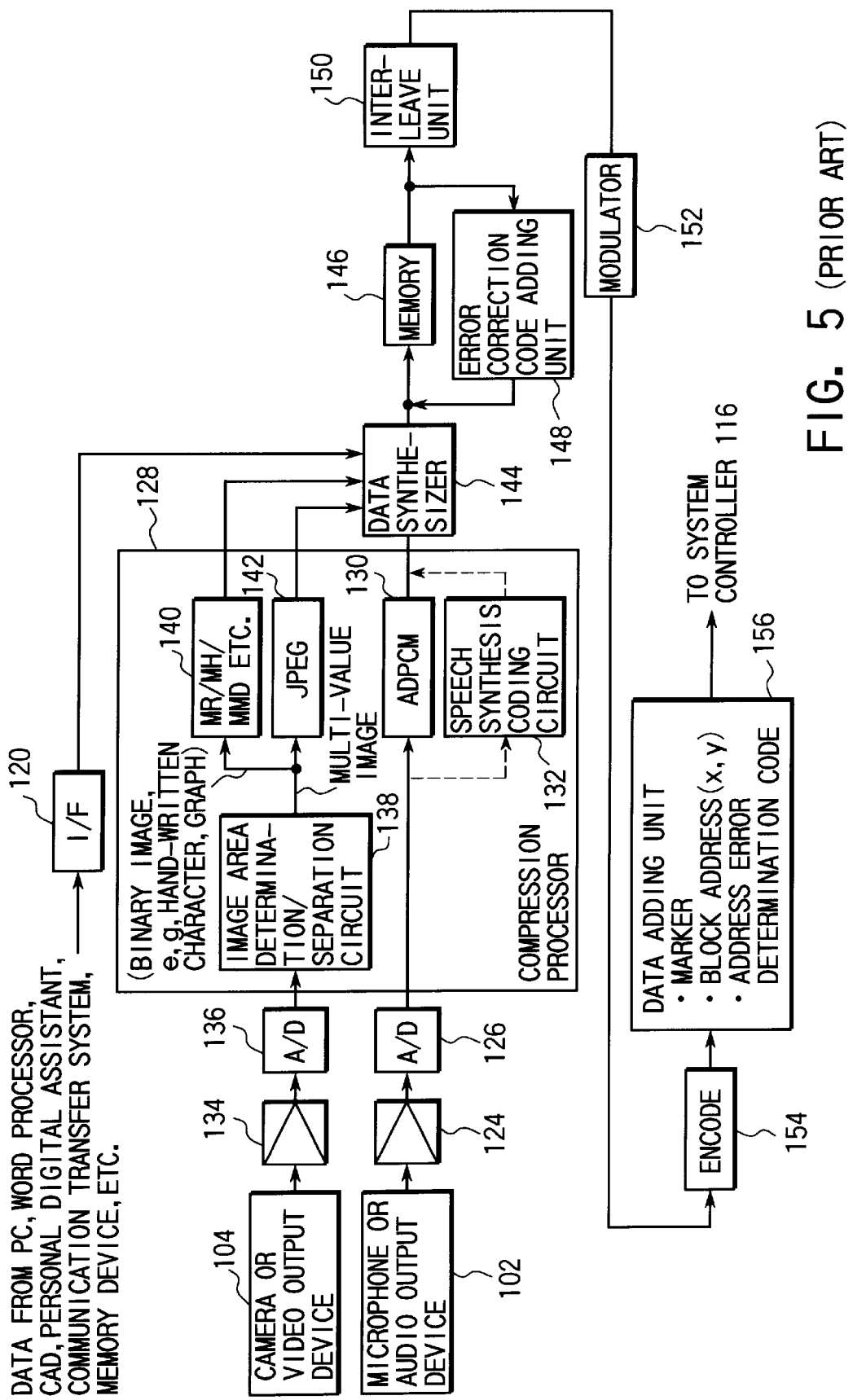
FIG. 5 is a block diagram of a conventional dot code generating unit applicable to the code printing apparatus according to the first embodiment.

FIG. 5 shows the structure of the dot code generator 110 applicable to the present embodiment, as disclosed in EP 0,670,555 A1. Specifically, audio information in the multimedia information is input from the microphone 102 or audio output device, amplified by a preamplifier 124, A/D converted to by an A/D converter 126, and then supplied to a compression processor 128.

The compression processor 128, the input digital audio signal is delivered selectively to one of a speech compression circuit 130, such as an ADPCM circuit, and a speech synthesis coding circuit 132. The speech compression circuit 130 compresses the input digital audio information by subjecting the same to adaptive differential PCM. The speech synthesis coding circuit 132 recognizes one speech data unit in the input digital audio information and converts the recognized speech data unit to a code. In the ADPCM, the speech information is coded in its own form to decrease the amount of data. By contrast, in the speech synthesis coding circuit 132, the speech information is once converted to another synthesis code, thus relatively decreasing the amount of data. The selective supply of the input digital audio signal may be manually switched by the user by means of a switch according to the purpose, or may be automatically switched after the input audio information is recognized. In the latter case, for example, it may be decided in advance that high-quality information such as information from the audio output device is supplied to the speech compression circuit 130, and speeches and comments from the microphone 102 is supplied to the speech synthesis coding circuit 132. Thus, the audio information can be automatically delivered to one of the speech compression circuit 130 and speech synthesis coding circuit 132 according to the input source.

Image information from the camera 104 or video output device is amplified by a preamplifier 134, A/D converted by an A/D converter 136, and supplied to the compression processor 128.

In the compression processor 128, an image area determination/separation circuit 138 determines whether the input image information represents a binary (two-value) image such as a hand-written character or a graph, or a multi-value image such as a natural image. The image area determination/separation circuit 138 may separate binary image data and multi-value image data by means of a determination image area separation method using a neural network, as disclosed in U.S. Ser. No. 08/562,637 filed by the assignee of the present invention. The binary image data is compressed by a binary compression processor 140 such as MR/MH/MMD, etc. generally adopted for JBIG, etc. The multi-value image data is compressed by a multi-value compression processor 142 by means of a compression function for static images such as DPCM, JPEG, etc.

The data properly compressed by the compression processor 128 is supplied to a data synthesizer 144. Digital code data from a personal computer, a word processor, a CAD, a personal digital assistant, a communication transfer system, etc. is supplied, where necessary, to the data synthesizer 144 via the external interface 120. The data synthesizer 144 synthesizes the supplied data, and the synthesized data is temporarily stored in a data memory 146.

All information input systems and compression process systems are not necessary provided in parallel. In accordance with purposes, one system may be used or plural systems may be properly combined. Accordingly, the data synthesizer 144 may not necessarily be provided. In the case where only one data system is provided, the data synthesizer 144 may be omitted and the data may be input directly to the next-stage data memory 146.

The synthesis data stored in the data memory 146 is read out by an error correction code adding unit 148. After an error correction code is added, the data is restored in the data memory 146. The synthesis data to which the error correction code has been added is read out by an interleave unit 150 and interleaved. In the interleave process, successive data sequences are dispersed at proper distances in order to reduce as much as possible an error occurring in reproducing an actually recorded dot code, for example, a block error due to noise. Specifically, the possibility of a burst error is reduced to a level of a bit error.

In the present embodiment, the interleave process is performed after the error correction code is added. However, needless to say, the error correction code may be added after the interleave process is completed.

The interleaved data is modulated by a modulator 152, encoded by an encoder 154, and supplied to a data adding unit 156. The modulator 152 performs, for example, 8–10 modulation. In the data adding unit 156, a marker, a block address and an address error determination code (CRC, etc.) are added to the supplied data. The resultant data is output to the system controller 116.

Figure 6:
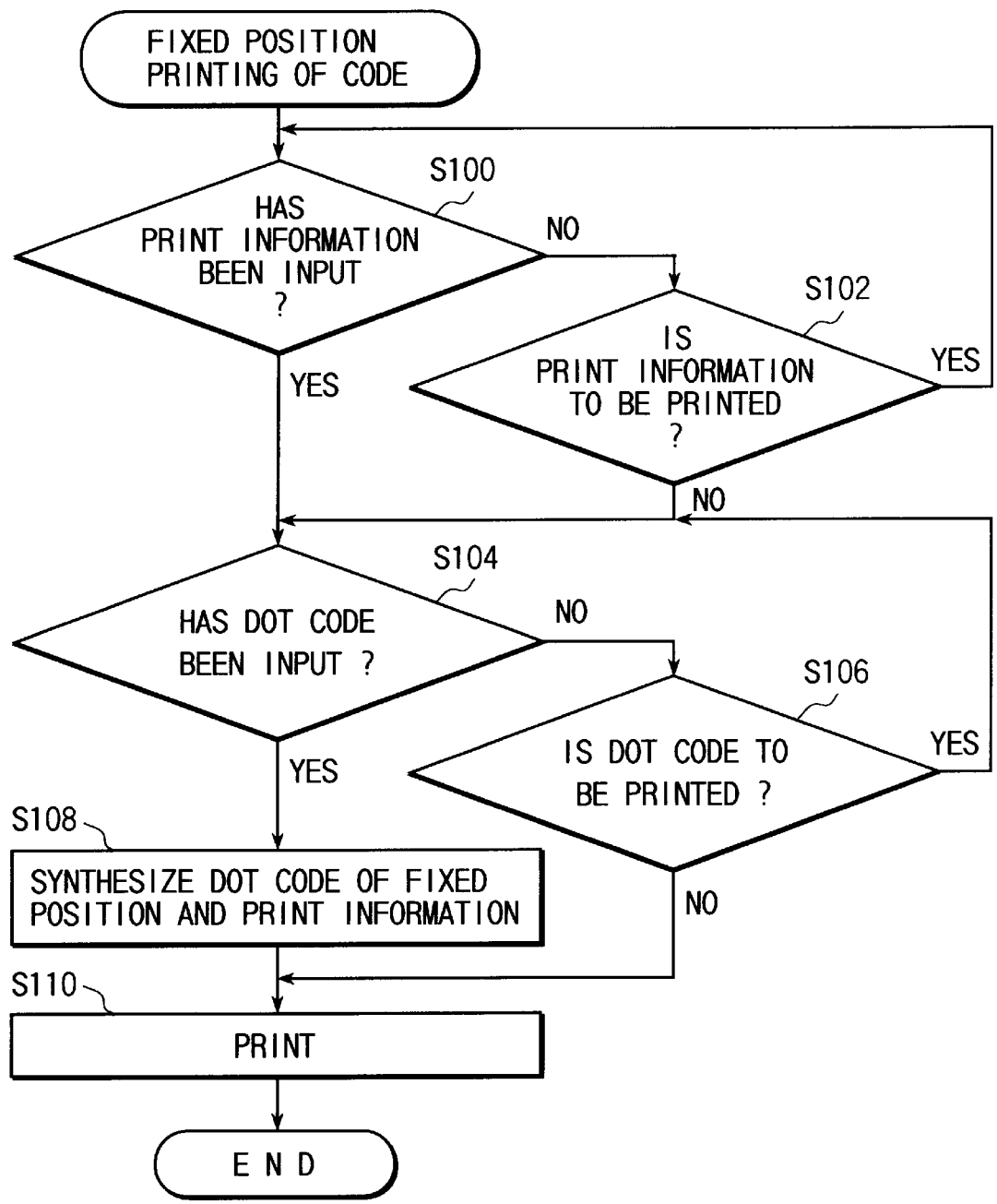
FIG. 6 is a flow chart illustrating the operation of the code printing apparatus according to the first embodiment.

FIG. 6 is a flow chart illustrating the operation of the system controller 116.

At first, in step S100, it is confirmed whether sheet print information has been input. If no sheet print information has been input, it is then confirmed whether sheet print information is to be printed (step S102). If sheet print information is to be printed, the control returns to step S100 to wait for the input of information.

If it has been determined in step S100 that the sheet print information has been input or in step S102 that no sheet print information is to be printed, it is confirmed whether image information to be printed as a dot code has been input from the dot code generator 110 (step S104). If no dot code has been input, it is confirmed whether a dot code is to be printed (step S106). If a dot code is to be printed, the control returns to step S104 to wait for the input of the dot code.

If the dot code has been input in step S104, the dot code and the input sheet print information are synthesized so that the dot code may be put on a fixed position determined on the basis of the detection result of the medium size from the medium size detector 112 and the information from the print position setting unit 114 (step S108). The synthesis result is printed out by the printer 122 (step S110).

If it has been determined in step S106 that no dot code is to be printed, the control goes to step S110 and the input sheet print information is printed out by the printer 122. Needless to say, when it is determined that print information is not to be printed in step S102, a determination portion is provided in step S110 and this process is finished without printing out. The same applies to the flow charts described below.

Information on the fixed position at which the dot code is to be printed is set within the code printing apparatus 100, and the dot code is printed at the fixed position. Thereby, the dot code 10 can be automatically printed on the sheet surface of the print output medium 108, without the user being conscious of the printing.

In the above description, the multimedia information is converted to a dot code, and the dot code is printed on the print output medium 108 along with the sheet print information such as characters and/or pictures from the personal computer 106. However, the print output medium 108 may be obtained by using a scanner which can be included in the code printing apparatus 100. In this case, sheet print information such as characters and/or pictures printed on the print medium 158, as shown in FIG. 3, is read by the scanner, and the read information and the dot code 10 are synthesized and printed on the print sheet, thus obtaining the print output medium 108. In this case, the medium size detector 112 detects the size of the print medium 158 on the basis of the sheet print information read by the scanner (not shown). In addition, the print position of the dot code 10 is predetermined according to the size of, e.g. the print sheet or output medium 108, or the print medium 158 to be read.

The print medium 158 to be read may be used as a print sheet as it is. In this case, a dot code of a speech input from the microphone 102 is printed on the print medium 158 on which sheet print information such as characters or pictures, other than codes, has already been printed. In this way, the print output medium 108 is obtained.

[Second Embodiment]

A second embodiment of the present invention will now be described. In this embodiment, a peripheral position on the print medium 158 to be read, where sheet print information such as a character or pictures is not printed, is detected, and a dot code is printed at the peripheral portion on the print medium 158. Thus, a print output medium 108 is obtained. Alternatively, the read sheet print information is printed on a print sheet with no print information, and a dot code is printed at the detected peripheral position, thereby obtaining the print output medium 108.

Figure 7:
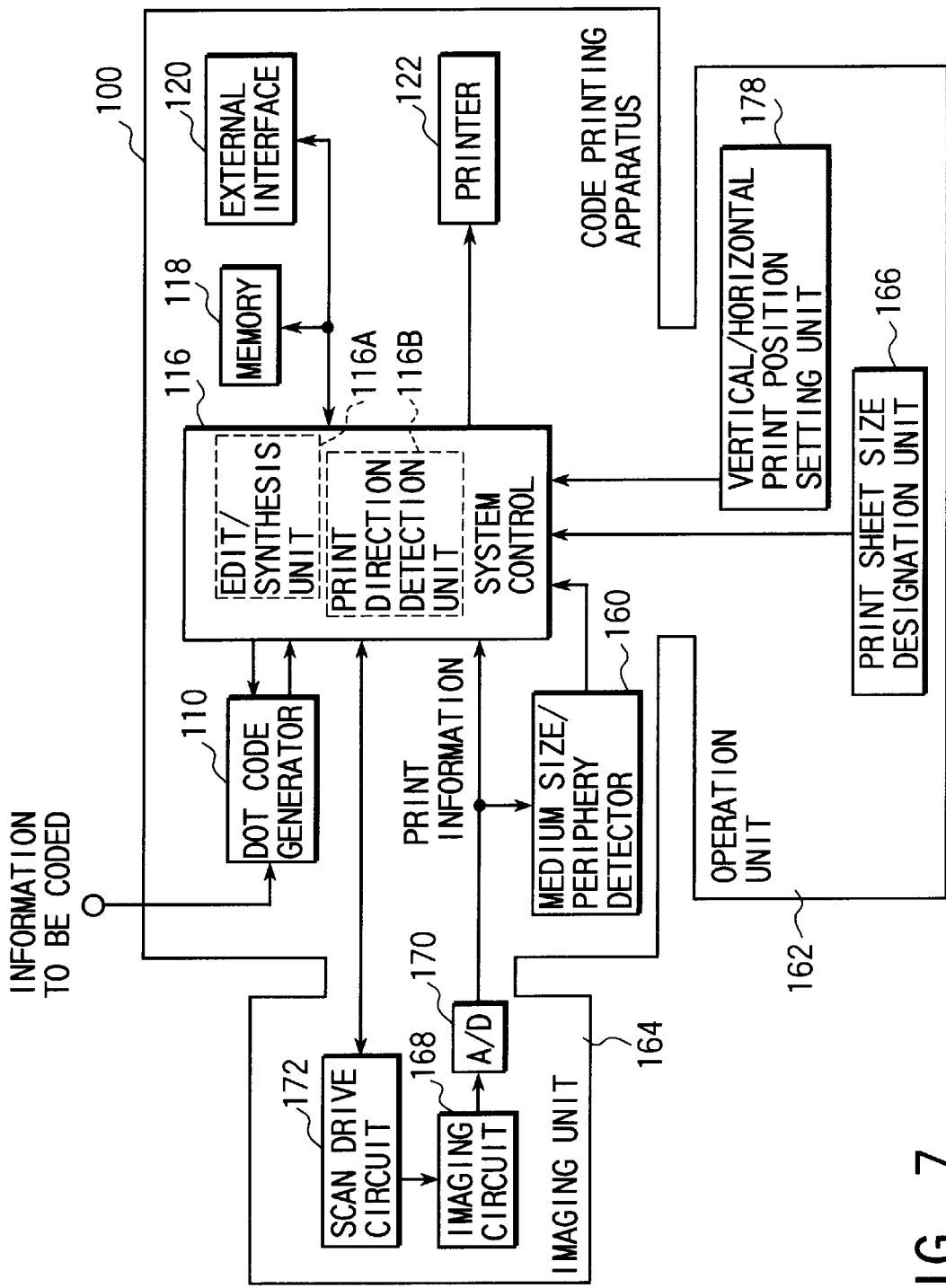
FIG. 7 is a block diagram showing a code printing apparatus according to a second embodiment of the present invention.

FIG. 7 is a block diagram showing the structure of the second embodiment. The structural elements common to those in the first embodiment as shown in FIG. 4 are denoted by like reference numerals. In the code printing apparatus 100, the medium size detector 112 in the first embodiment is replaced with a medium size/periphery detector 160, the print position setting unit 114 is replaced with an operation unit 162, and an imaging unit 164 is added. The operation unit 162 includes a print sheet size designation unit 166. The imaging unit 164 comprises an imaging circuit 168, an A/D converter 170 and a scan drive circuit 172. The system controller 116 includes, in addition to the edit/synthesis unit 116A, a print direction detection unit 116B for detecting the print direction of sheet print information on the print medium 158.

Specifically, in the imaging unit 164, the scan drive circuit 172, upon receiving a command from the system controller 116, drives the imaging circuit 168 in a main scan direction and a sub-scan direction, thereby to image the print medium 158 to be read. In this embodiment, the imaging circuit 168 includes a line sensor. However, needless to say, the imaging circuit 168 may include a two-dimensional sensor, etc. An output from the imaging circuit 168 is converted to digital data by the A/D converter 170 and stored in the memory 118 through the system controller 116.

The output data from the A/D converter 170 is also input to the medium size/periphery detector 160. Based on the input data, the medium size/periphery detector 160 detects the size of the print medium 158 and the periphery or edges thereof. The detected result is output to the system controller 116.

On the other hand, the print sheet size designation unit 166 of operation unit 162 is constructed, for example, as an operation panel switch. The print sheet size designation unit 166 is operated to designate the size of a print paper sheet or print output medium 108. For example, if a print output medium, which has a size different from that of the print medium 158 detected by the medium size/periphery detector 160, is to be used, the size of the print output medium is designated by the print sheet size designation unit 166.

Figure 8:
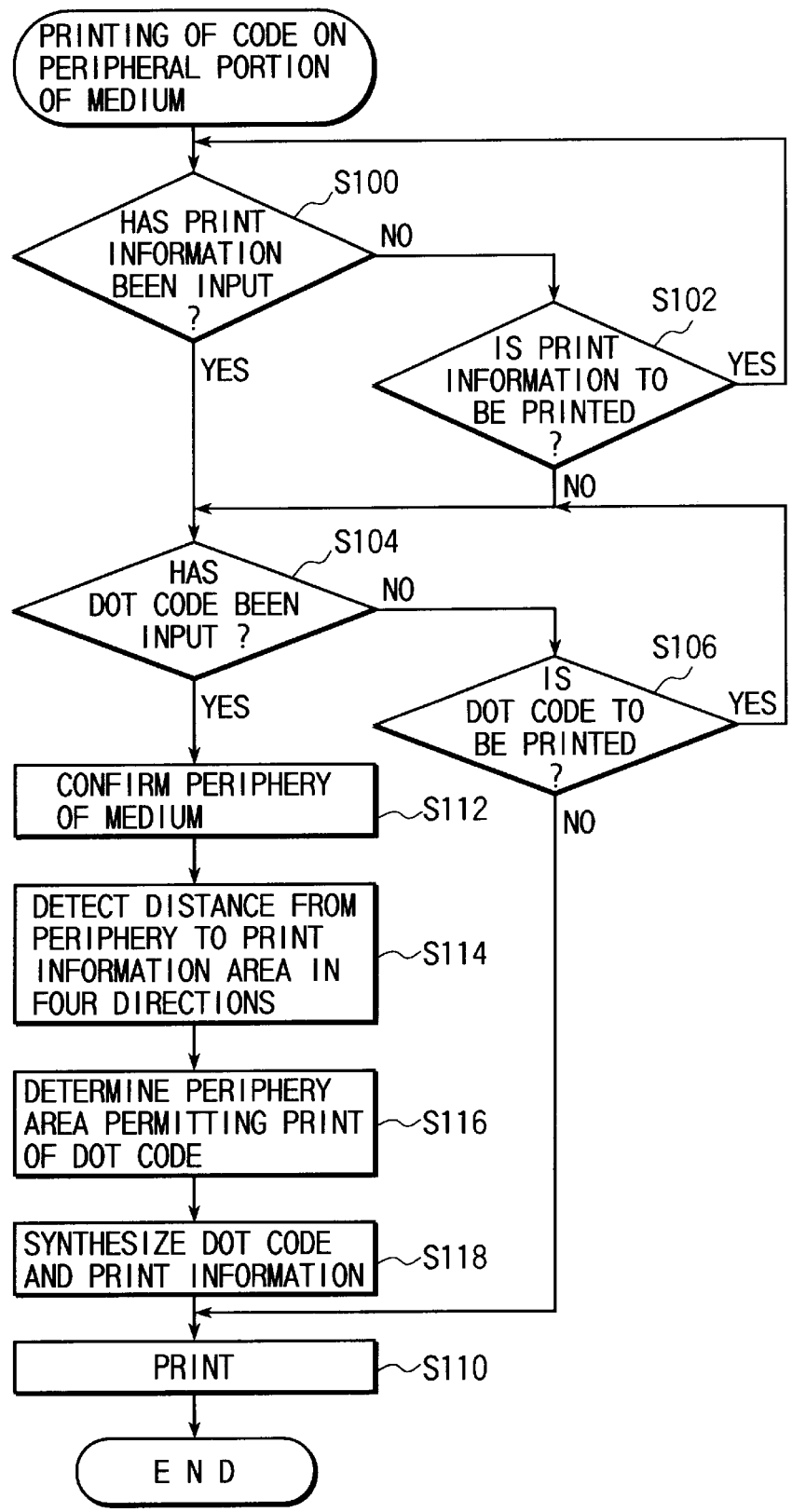
FIG. 8 is a flow chart illustrating the operation of the code printing apparatus according to the second embodiment.

FIG. 8 is a flow chart illustrating the operation of the system controller 116 in the second embodiment. The operation steps common to those shown in FIG. 6 in the first embodiment are denoted by like reference numerals.

In steps S100 to S106, like the first embodiment, it is confirmed whether print information and a dot code have been input and are to be printed. If it is determined in step S104 that the dot code has been input, the periphery of the print medium 158 to be read is confirmed on the basis of the output from the medium size/periphery detector 160 (step S112).

Figure 9:
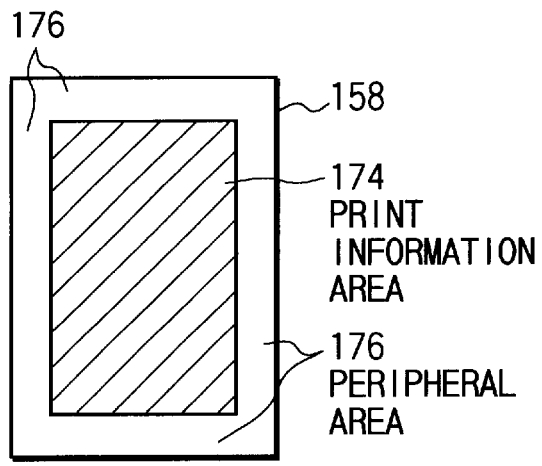
FIG. 9 is a view for explaining a print information area and a peripheral area.

The distances from the periphery to the print information area in four directions are detected, and the size of each of four peripheral areas is detected (step S114). Specifically, as shown in FIG. 9, imaging data stored in the memory 118 is scanned from the determined peripheral position and the range of a print information area 174 on print medium 158 on which sheet print information such as a character or a picture is printed. Thus, peripheral areas 176 or blank portions of the medium, except the print information area 174, are detected. The print information area 174 and peripheral area 176 can be generally distinguished by binary data. If there is any print information on the sheet, the area with the information is dark. Otherwise, the area is white. This distinction should be made after shading correction is performed.

After the size or area of each of the four peripheral areas has been detected, the peripheral area having the largest area, on which a dot code can be printed, is determined (step S116). The dot code and sheet print information are synthesized so that the dot code is located on the determined peripheral area (step S118). The synthesized data is printed out by the printer 122 (step S110).

As has been described above, when a dot code is to be printed, the peripheral area 176 where the dot code would not interfere with the sheet print information is automatically detected and the dot code is printed on the detected area 176. Thus, the dot code can be exactly printed.

[Third Embodiment]

A third embodiment of the invention will now be described. In the third embodiment, the printing apparatus of the second embodiment is additionally provided with a function of designating the printing direction of the dot code, i.e. selecting one of the vertical and horizontal direction of the print sheet.

Figure 10:
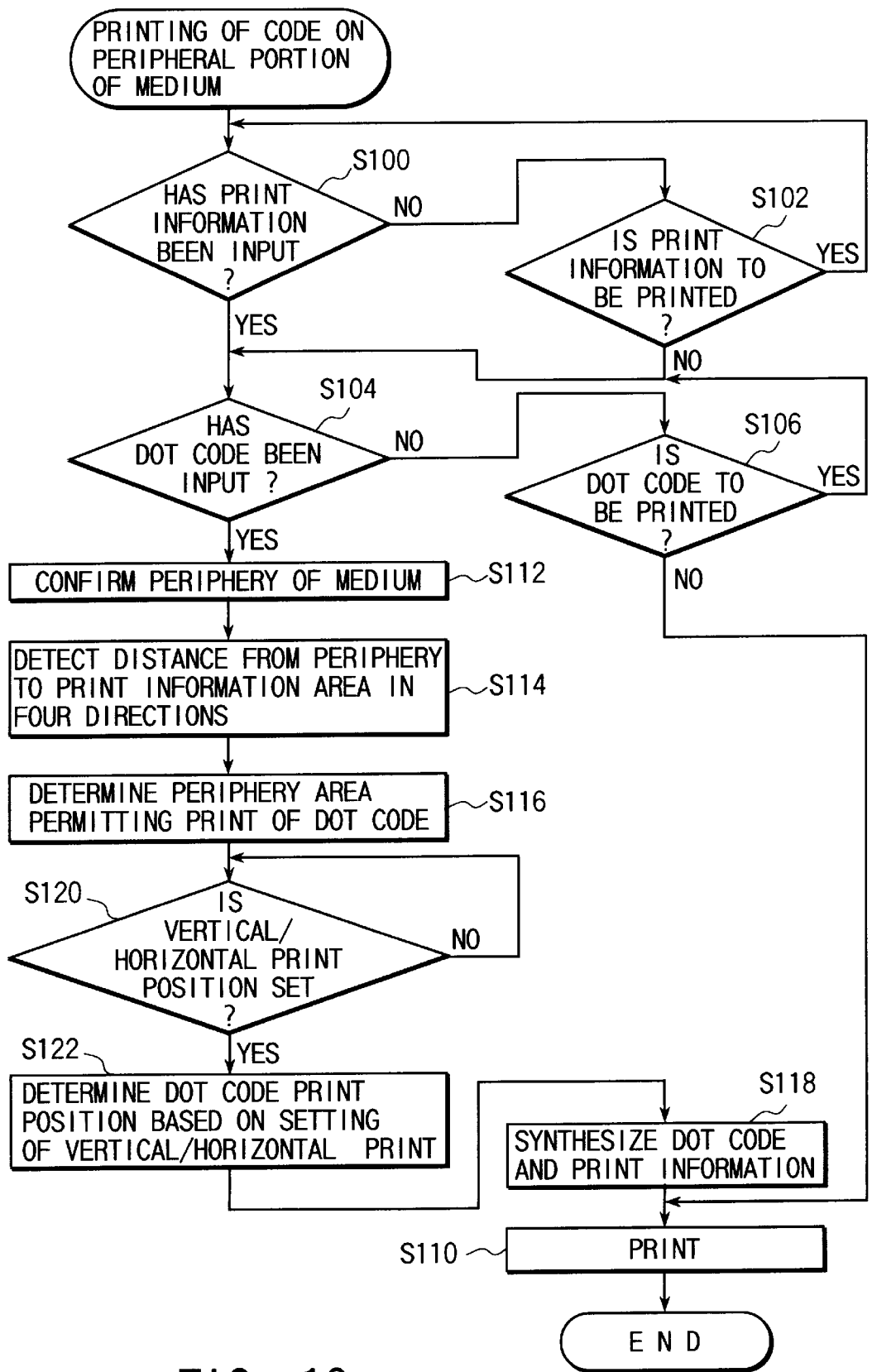
FIG. 10 is a flow chart illustrating the operation of a code printing apparatus according to a third embodiment of the invention.

Specifically, a vertical/horizontal print position setting unit 178 shown in FIG. 7 is added as a structural element. The operational flow additionally includes step S120, between the steps S116 and S118 in FIG. 10, for determining whether the vertical/horizontal print position has been set by the vertical/horizontal print position setting unit 178, and step S122 for determining the peripheral area 176 for printing the dot code, on the basis of the determination result input by the vertical/horizontal print position setting unit 178.

In the third embodiment, the dot code can be printed on the peripheral area 176 so as not to interfere with the sheet print information. In addition, the user can confirm and determine whether the dot code is to be printed vertically or horizontally. Therefore, the dot code can be printed more exactly.

[Fourth Embodiment]

A fourth embodiment of the present invention will now be described. In the fourth embodiment, the direction of printing of print information is recognized on the basis of print information read by a scanner. A dot code is printed on the peripheral area 176 in the recognized direction.

The structure of the fourth embodiment is similar to that shown in FIG. 7. However, in the fourth embodiment, it is necessary to provide the system controller 116 with a character recognition function and a function of determining the print direction of print information on the basis of the result of the character recognition. The character recognition function is not described here since it is applied in various technical fields.

Figure 11:
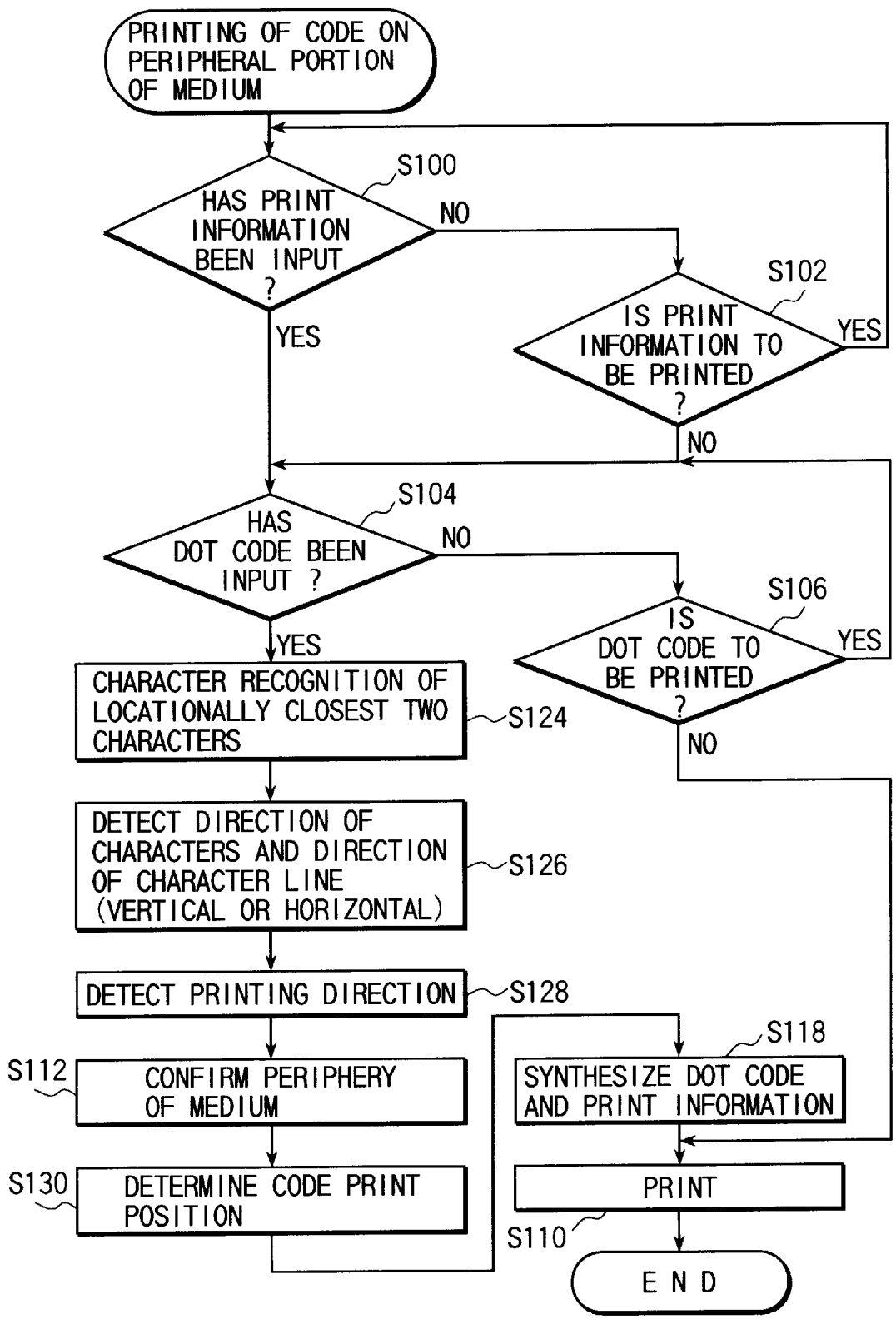
FIG. 11 is a flow chart illustrating the operation of a code printing apparatus according to a fourth embodiment of the invention.

FIG. 11 is a flow chart illustrating the operation of the system controller 116 in the fourth embodiment.

Figure 12:
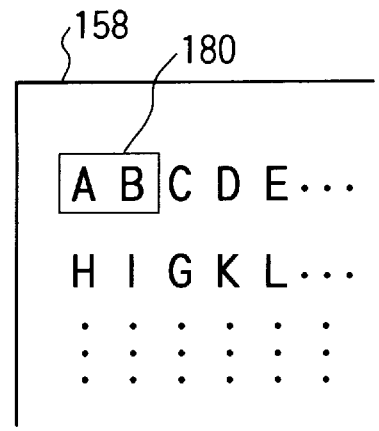
FIG. 12 is a view for explaining adjacent two characters.

In steps S100 to S106, it is confirmed, like the first embodiment, whether the print information and dot code have been input and are to be printed. If it is determined in step S104 that the dot code has been input, locationally closest two characters, as indicated by a rectangle 180 in FIG. 12, are recognized (step S124). Based on the recognition result, the direction of characters and the direction of a character line are detected (step S126). When one character is recognized, the direction thereof can be detected. In this case, however, the direction (vertical or horizontal) of a character line including this character cannot be detected. In the present embodiment, attention is paid to the fact that the interval between characters is generally smaller than that between character lines. Thus, by recognizing locationally closest two characters, it is recognized whether the character lines extend vertically or horizontally.

The direction of printing of sheet print information is detected on the basis of the detection result relating to the direction of characters and the direction of character lines (step S128). Then, the peripheral area 176 of print medium 158 is detected, like the preceding embodiment (step S112). On the basis of the detection result relating to the print direction, one of the peripheral areas 176 is determined as a code print position (step S130). The dot code and sheet print information are synthesized so that the dot code may be located at the determined code print position (step S118). The synthesized data is printed out by the printer 122 (step S110).

Thereby, the operation of the printing apparatus is made easier, compared to the third embodiment.

In the fourth embodiment, too, the sheet print information can be input from the personal computer 106. In this case, information on the direction of characters, direction (vertical/horizontal) of character lines and direction of print is supplied as attributive information, and thus the process of steps S124 and S126 is not necessary.

[Fifth Embodiment]

A fifth embodiment of the present invention will now be described. In this embodiment, an overlap in printing between sheet print information and a dot code is prevented.

Figure 13:
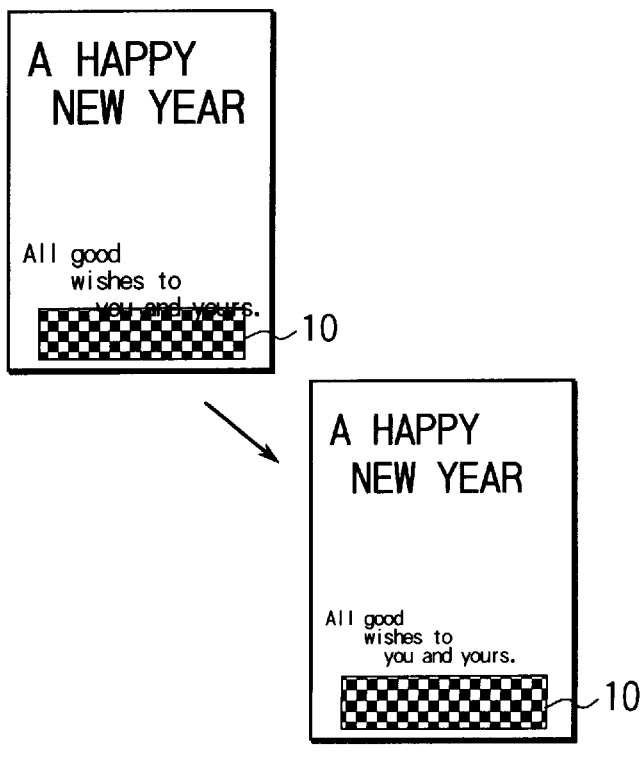
FIG. 13 shows an example of a printed dot code image, for describing the operation of a code printing apparatus according to a fifth embodiment of the invention.

If the dot code 10, which is too large, and sheet print information are synthesized as they are, the dot code will not be included in such a predetermined area, as is mentioned in the description of the first embodiment. The dot code would overlap sheet print information (a character sequence "you and yours." in this embodiment), as shown in the upper left portion of FIG. 13. In order to avoid this problem, some layout change is automatically performed. For example, the sheet print information is reduced and the reduced sheet print information and the dot code are synthesized, as shown in the lower right portion of FIG. 13.

Figure 14:
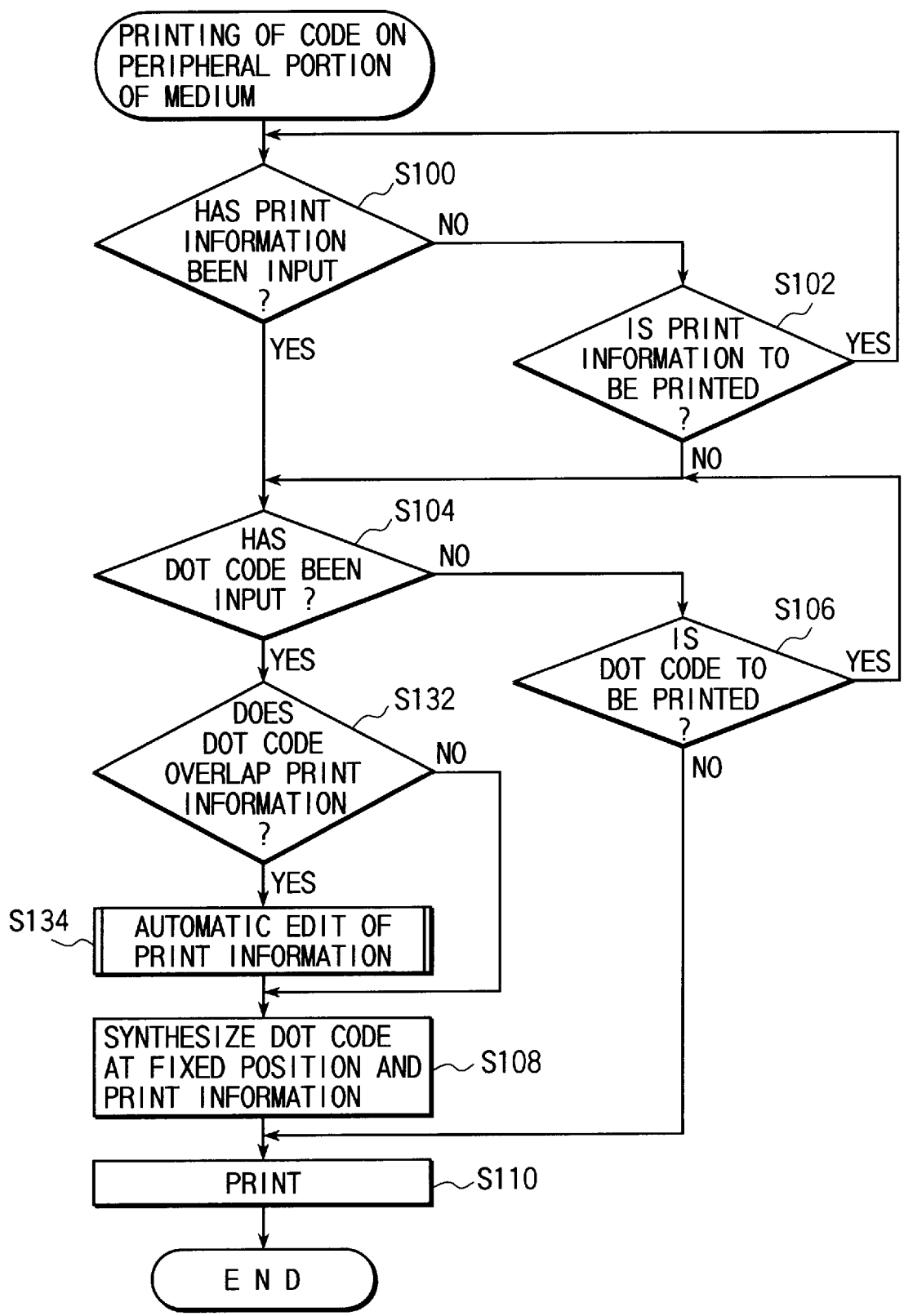
FIG. 14 is a flow chart illustrating the operation of the code printing apparatus according to the fifth embodiment of the invention.

FIG. 14 is an operational flow chart illustrating the operation of the system controller 116 in the fifth embodiment.

In step S104 in FIG. 6 relating to the first embodiment, if it is determined that the dot code has been input, it is then determined whether the dot code overlaps sheet print information (step S132). If not, the control goes to step S108, the dot code and sheet print information are synthesized so that the dot code may be located at the fixed position. Then, the synthesized information is printed out by the printer 122 in step S110.

On the other hand, if it is determined in step S132 that the dot code overlaps the sheet print information, an automatic edit process, such as reduction of sheet print information, is performed (step S134). Then, in step S108, the dot code is synthesized with the sheet print information so that the dot code may be located at the fixed position. In step S110, the synthesized information is printed out by the printer 122.

Figure 15:
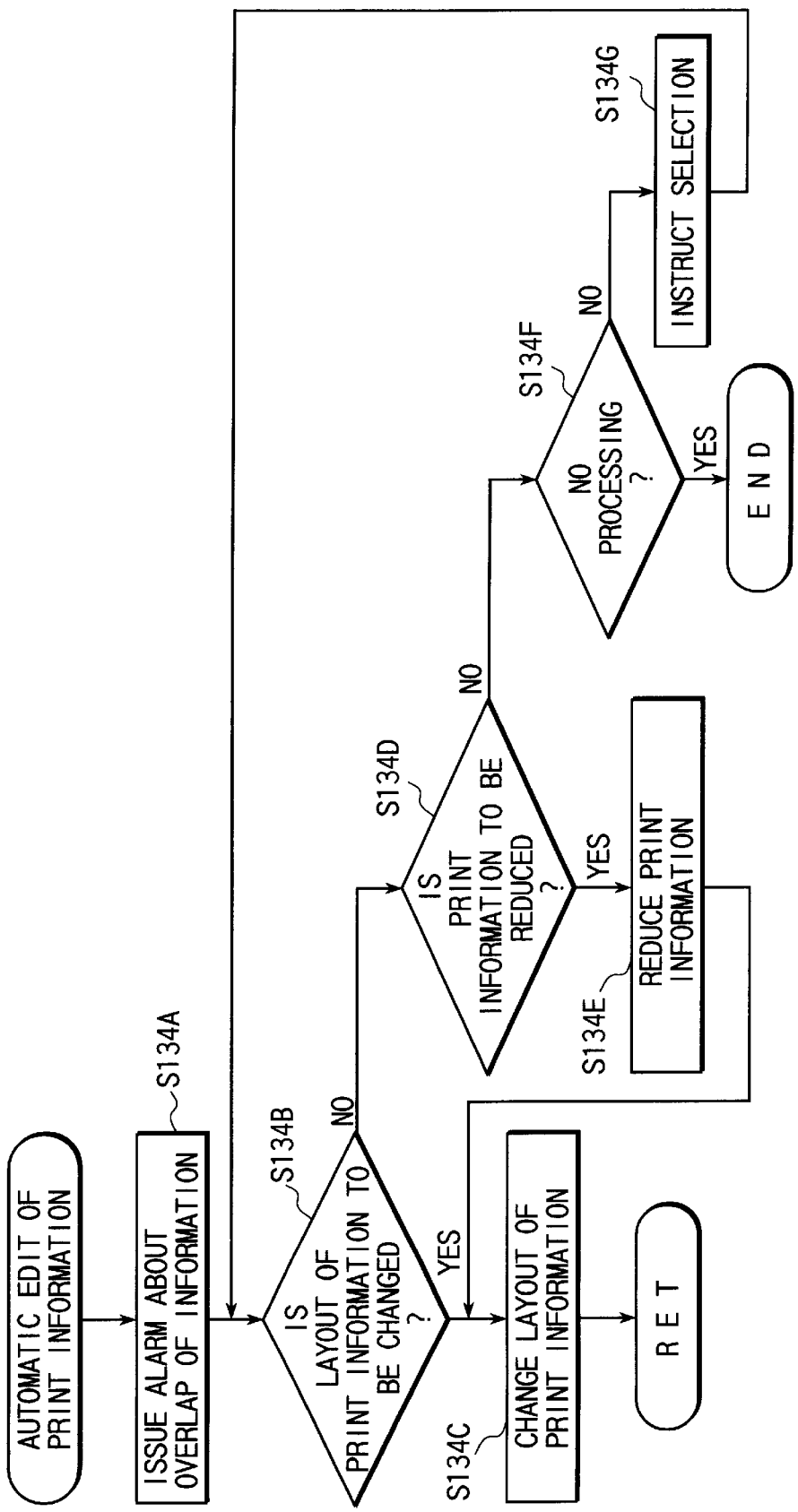
FIG. 15 is a flow chart illustrating an automatic edit process of sheet print information in the operation illustrated in FIG. 14.

The automatic edit process of sheet print information in step S134 is performed, as illustrated in FIG. 15.

Specifically, the user is alarmed of the overlap between the dot code and sheet print information by means of an alarm lamp or an alarm sound (not shown) (step S134A). Then, a process corresponding to an edit method, which is selected by means of a switch (not shown), is performed. If a change of layout of sheet print information is designated (step S134B), the print position, for example, is changed (step S134C). The control then advances to step S108. If reduction of print information is designated (step S134D), the sheet print information is reduced (step S134E). Then the layout of information is changed in step S134C and the control goes to step S108. Alternatively, if no process is designated (step S134F), this process is finished. If no selection of process is made, the user is alarmed to make some selection by means of an alarm lamp or an alarm sound different from that used in step S134A (step S134G). Then, the control returns to step S134B.

As has been described above, the overlap in printing between the sheet print information and dot code is prevented without the need to alter the dot code. Therefore, the dot code can be exactly printed.

Needless to say, the automatic edit process in the fifth embodiment for avoiding an overlap between the dot code and sheet print information is applicable to the second to fourth embodiments wherein the dot code is to be printed on the determined peripheral area 176.

[Sixth Embodiment]

Figure 16:
FIG. 16 shows an example of a printed dot code image, for describing the operation of a code printing apparatus according to a sixth embodiment of the present invention.

A sixth embodiment of the present invention will now be described. In the sixth embodiment, identical dot codes 10 are printed on a plurality of peripheral areas 176, for example, upper and lower peripheral areas, as shown in FIG. 16.

Figure 17:
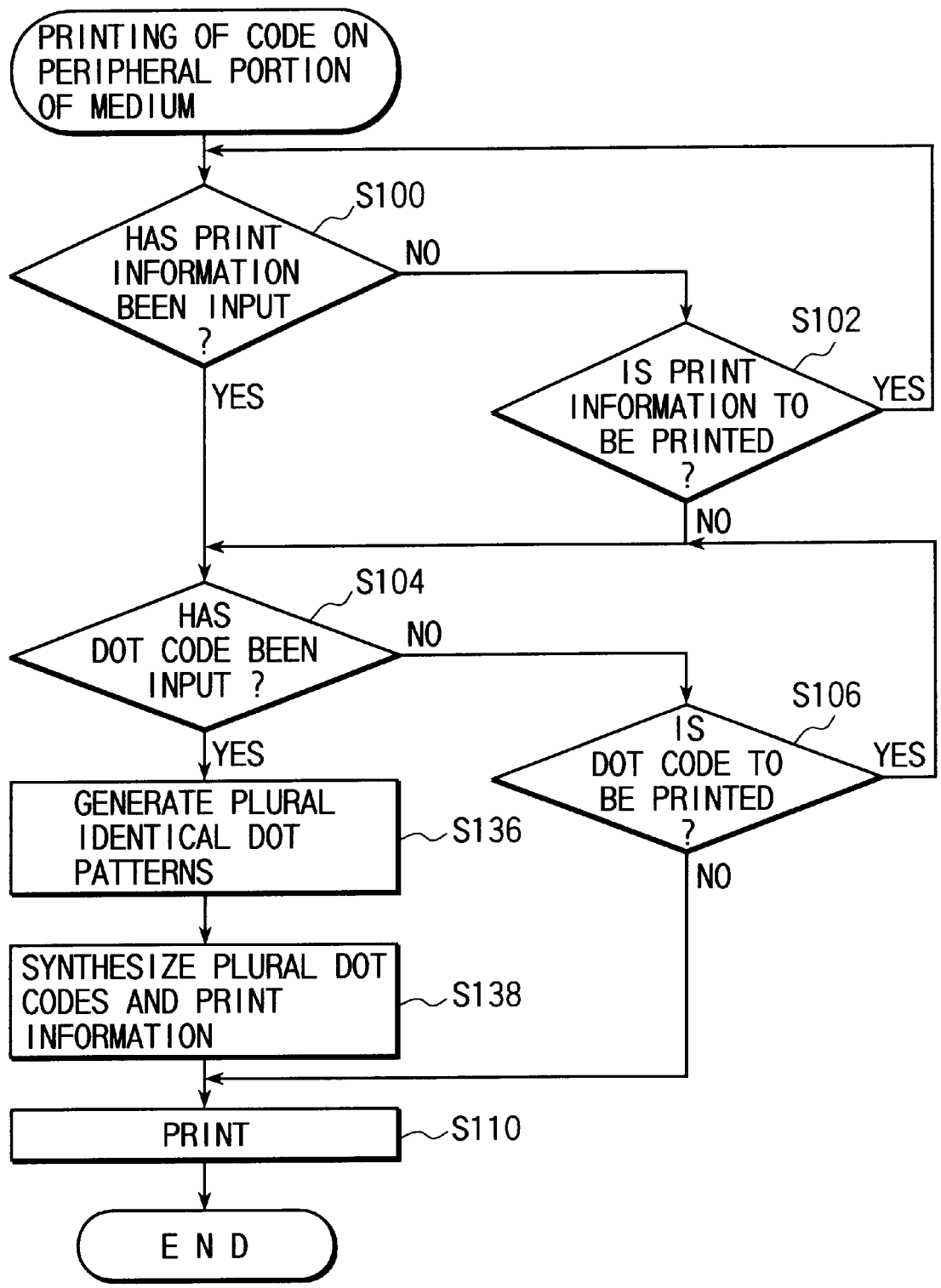
FIG. 17 is a flow chart illustrating the operation of the code printing apparatus according to the sixth embodiment of the invention.

FIG. 17 is a flow chart illustrating the operation of the system controller 116 in the sixth embodiment. The steps common to those in FIG. 6 relating to the first embodiment are denoted by like reference numerals.

Like the first embodiment, it is confirmed in steps S100 to S106 whether the print information and dot code have been input or are to be printed. If it is determined in step S104 that the dot code has been input, plural identical dot codes are generated (step S136). The plural identical dot codes are synthesized with the sheet print information (step S138). The result of synthesis is printed out by the printer 122 (step S110).

In this embodiment, plural identical dot codes are printed on the peripheral areas 176 which are held by the hand and tend to become dirty. Since it is not highly possible that all the dot codes become dirty similarly, the information of the dot code can be reproduced by using any one of the plural dot codes.

[Seventh Embodiment]

A seventh embodiment of the present invention will now be described. In the seventh embodiment, the data length (amount) of input information to be coded is detected, thereby to estimate the size of a dot code and determine the print position of the dot code.

Figure 18:
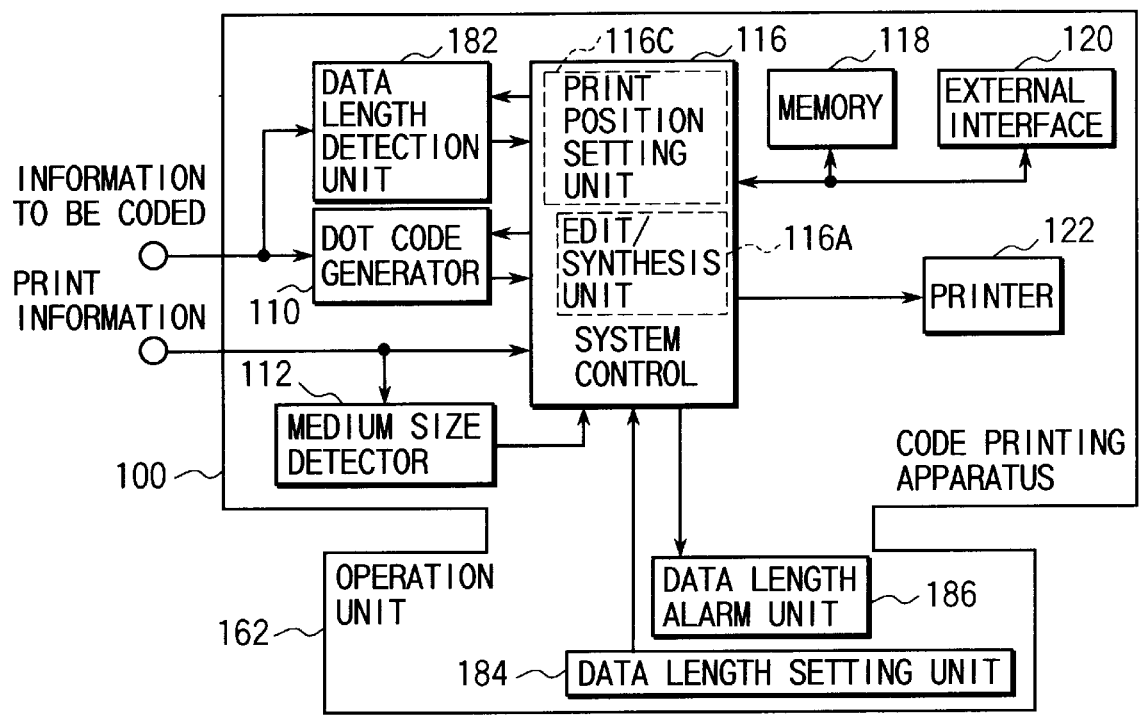
FIG. 18 is a block diagram showing a code printing apparatus according to seventh and eighth embodiments of the invention.

FIG. 18 is a block diagram showing the structure of the seventh embodiment. The structural elements common to those in FIG. 4 relating to the first embodiment are denoted by like reference numerals. Specifically, in the seventh embodiment, the code printing apparatus 100 according to the first embodiment is additionally provided with a data length detector 182 for detecting the data length of information to be coded. The system controller 116 further includes a print position setting unit 116C for setting the print position of the dot code. The print position setting unit 116C is operated to select one of preset fixed print positions.

Figure 19:
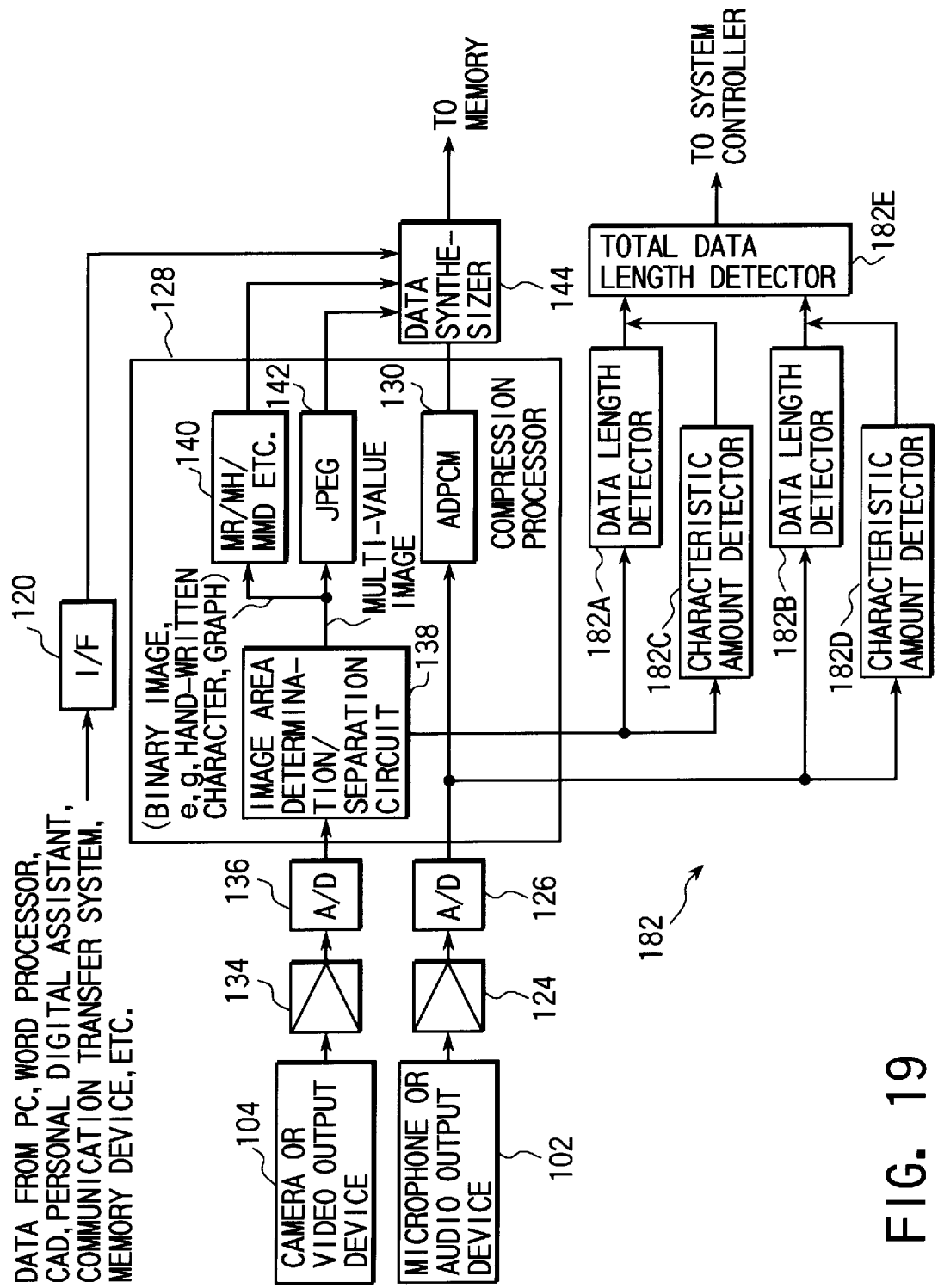
FIG. 19 is a block diagram showing the structure of a data-length detection unit in FIG. 18.

The data length detection unit 182, as shown in FIG. 19, comprises data length detectors 182A and 182B, characteristic amount detectors 182C and 182D, and a total data length detector 182E.

The data length detector 182A detects the data length of image data input from the data area determination/separation circuit 138. The data length, in this context, reflects a compression result in the compression processor 128, and refers to a data length of a dot code including data added by error correction in a subsequent stage. Thus, the characteristic amount of image data is detected by the characteristic amount detector 182C, and a detection result is delivered to the data length detector 182A. For example, in the case of an image having a monochromatic background, the background alone may be subjected to some other compression process. Depending on the amount of the background, the total data length varies. Thus, the characteristic amount of the background is detected by the characteristic amount detector 182C and delivered to the data length detector 182A. The data length detector 182A is supplied with information on a compression factor, etc. from the system controller 116, in order to reflect the compression result in the compression processor 128.

The same applies to speech data. In the data length detector 182C, the data length is detected on the basis of the characteristic amount detected by the characteristic amount detector 182D. The characteristic amount detection in the case of speech data includes detection of a non-speech component, etc.

The detection results from the data length detectors 182A and 182B are summed by the total data length detector 182E. The total data length of information to be converted to a dot code is thus detected and output to the system controller 116.

How to detect the data length will now be described. For example, a description will be given of the case where the data length of speech data is detected by the data length detector 182B.

Suppose that an input time is T[sec], a compression factor is C, a data amount D[bps], a redundancy factor relating to modulation, error correction, etc. is γ, a header area is H, and a non-speech period is M. In this case, the data length of a dot code is calculated as follows. The data amount D is multiplied with a time period obtained by subtracting the non-speech period M from the input time T. Thus, it is found how much data has been input. The found data amount is multiplied with the data compression factor C. On the other hand, the header provided to determine whether the code represents non-speech data or active data is not compressed. Thus, the header area data amount H is added to the calculation result. The resultant is multiplied with the redundancy factor γ, thereby to find the actual data length of the dot code. In other words, the data length of the dot code is given by data length of dot code=γ (C·D·(T−M)+H).

Figure 20:
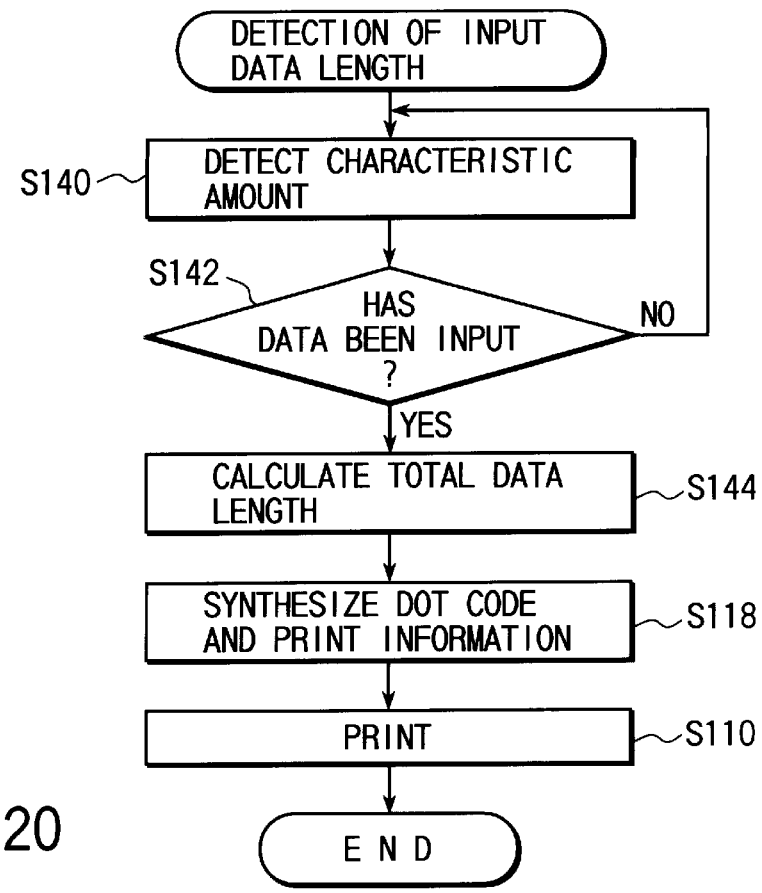
FIG. 20 is a flow chart illustrating the operation of a code printing apparatus according to a seventh embodiment of the invention.

FIG. 20 is a flow chart illustrating the operations of the data length detector 182 and system controller 116 in the seventh embodiment.

In the data length detector 182, if data to be coded is input, the characteristic amount detectors 182C and 182D detect characteristic amounts (step S140). It is then determined whether the input of data is completed (step S142). If the data is still being input, the control returns to step S140.

If the data input is completed, the data length detectors 182A and 182B detect data lengths and the total data length detector 182E calculates the total data length (step S144). Based on the total data length, the system controller 116 sets the print position of the dot code and synthesizes the dot code and sheet print information so that the dot code may be printed at the print position (step S118). The synthesis result is printed out by the printer 122 (step S110).

Thereby, the user can print the dot code corresponding to the data length.

Needless to say, the aforementioned detection of the peripheral position may be made in accordance with the data length, and the print position may be set so that the dot code may be recorded on the shorter-side peripheral blank portion when the data length is small.

The data length detector 182 is so constructed that the data length can be detected at the same time as the data has been input. If the real-time processing is not required, the structure of the apparatus may be modified such that the data length may be detected from the dot code generated by the dot code generator 110. In the above description, the detection of the image data length and speech data length alone was described. However, the technique of data length detection in this embodiment is also applicable to digital code data or text data input from the personal computer 106.

[Eighth Embodiment]

An eighth embodiment of the invention will now be described. In the eighth embodiment, an alarm is issued when the data length, obtained in the seventh embodiment, does not fall within the range set by the user.

In the eighth embodiment, as shown in FIG. 18, the operation unit 162 is provided with a data length setting unit 184 and a data length alarm unit 186.

Figure 21:
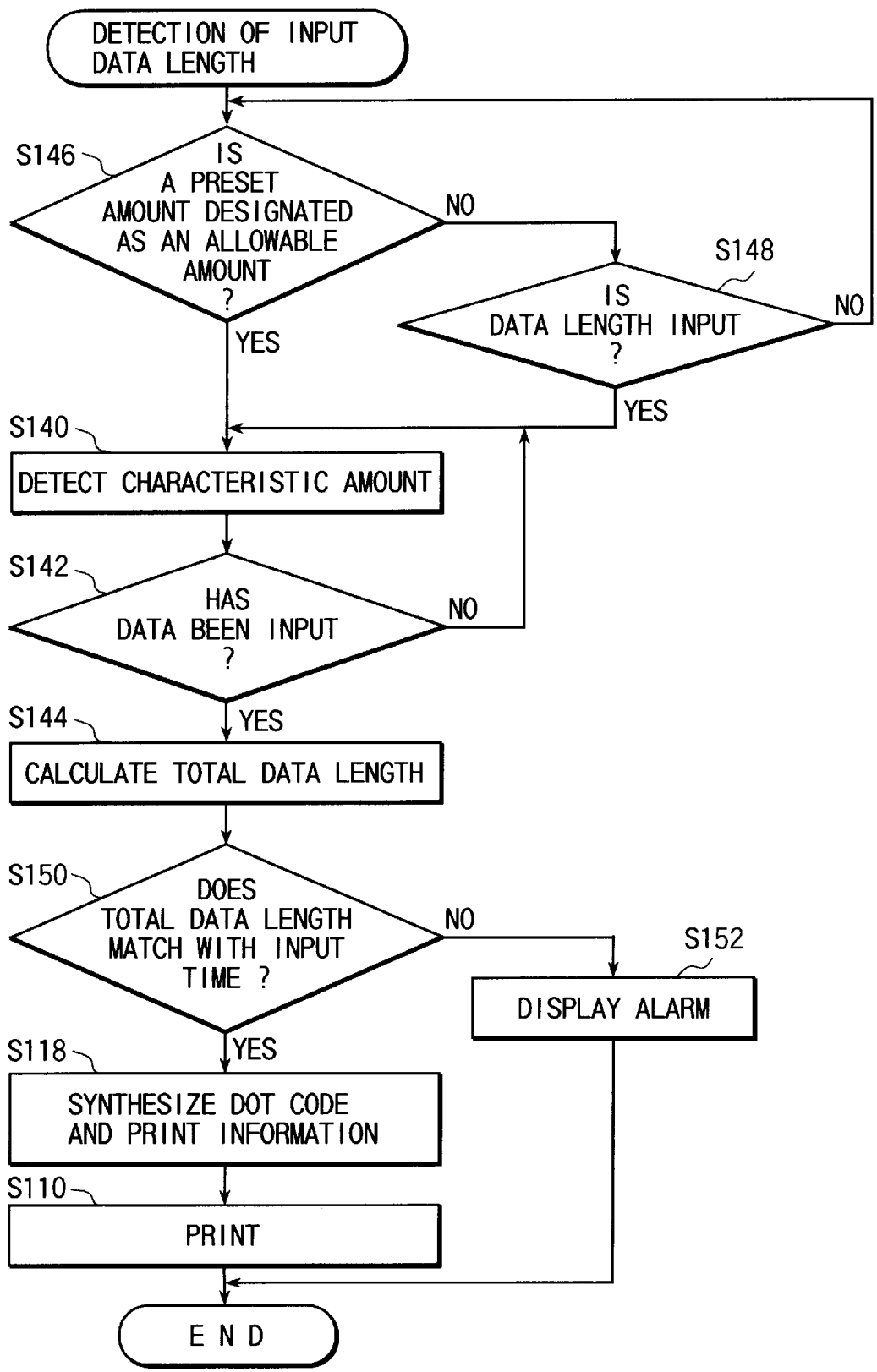
FIG. 21 is a flow chart illustrating the operation of a code printing apparatus according to an eighth embodiment of the invention.

FIG. 21 is a flow chart illustrating the operation of the present embodiment. It is determined whether a preset amount, which is preset in the code printing apparatus, is designated as an allowable amount (step S146). When the data length set by the user, and not the preset amount, is designated, it is confirmed whether the data length specified by the user is input from the data length setting unit 184 (step S148). If the data length specified by the user is not input, the control returns to step S146. Although the input of data length is performed by the user, it may be automatically effected from the apparatus side. For example, when one of preset fixed positions is selected as in the seventh embodiment, the allowable maximum data length of the selected position may be input. The same applies to the designation of the peripheral position.

If it is determined in step S146 that the preset amount is used or if it is determined in step S148 that the data length is set by the user in the data length setting unit 184, the characteristic amount is detected by the data length detection unit 182 (step S140) and at the same time the completion of input of data to be coded is awaited (step S142). When the data input is completed, the total data length is calculated (step S144).

It is then determined whether the calculated total data length can match with the input time, i.e. the preset amount or set input data length, in other words, whether the calculated total data length is within the allowable amount (step S150).

If "YES" in step S150, the print position of the dot code is set on the basis of the calculated total data length and the dot code and sheet print information are synthesized so that the dot code may be printed on the set print position (step S118). The synthesized information is printed out by the printer 122 (step S110).

On the other hand, if "NO" in step S150, an alarm is issued by the data length alarm unit 186 (step S152) and the present process is completed. In this case, the alarm may include an alarm sound and indication of message "the total data length is not within the time set by you" on an LCD.

As has been described above, when the information to be dot-coded has been input, the data length is detected before the input information is actually dot-coded. If the input information is not printable, an alarm is issued. Thus, useless coding processing can be prevented.

[Ninth Embodiment]

A ninth embodiment of the present invention will now be described. In the ninth embodiment, the user can freely set the print position of the dot code.

Figure 22:
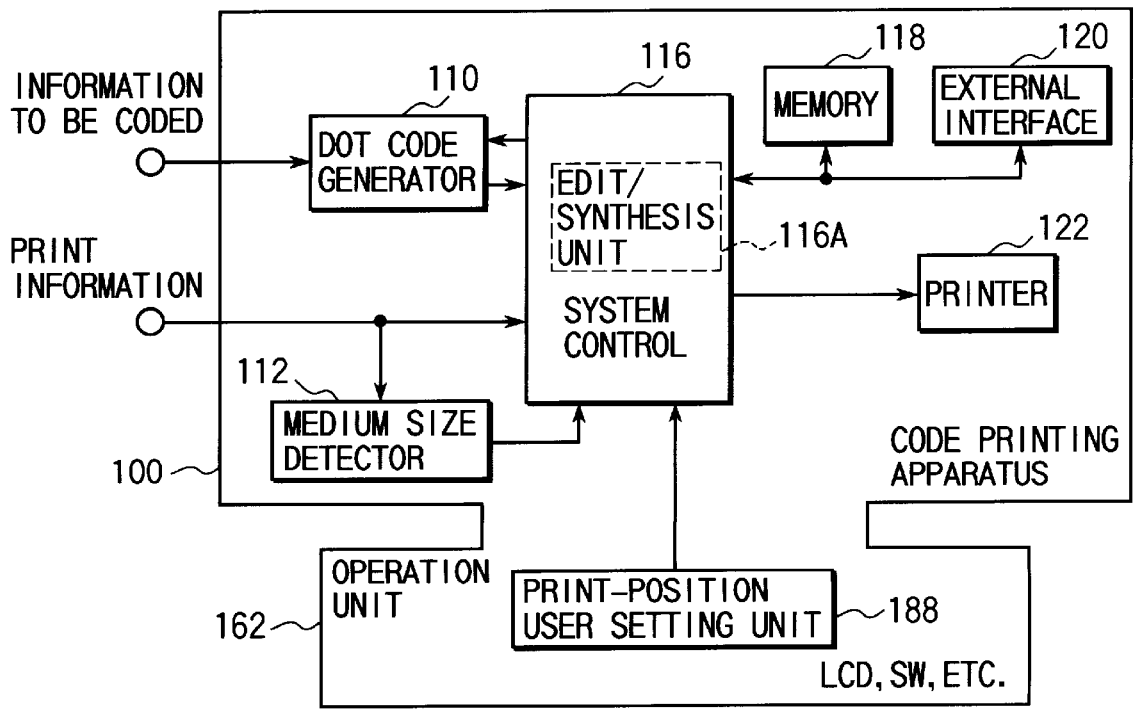
FIG. 22 is a block diagram showing a code printing apparatus according to a ninth embodiment of the present invention.

FIG. 22 is a block diagram showing the structure of the ninth embodiment. The structural elements common to those in FIG. 4 relating to the first embodiment are denoted by like reference numerals. In the code printing apparatus 100 of this embodiment, the print position setting unit 114 in the first embodiment is replaced with a print-position user setting unit 188 serving as operation unit 162. The print-position user setting unit 188 includes a switch for selecting one of predetermined positions, an LCD combined with an overlying touch panel, and a voluntary designation member such as a pointing device.

Figure 23:
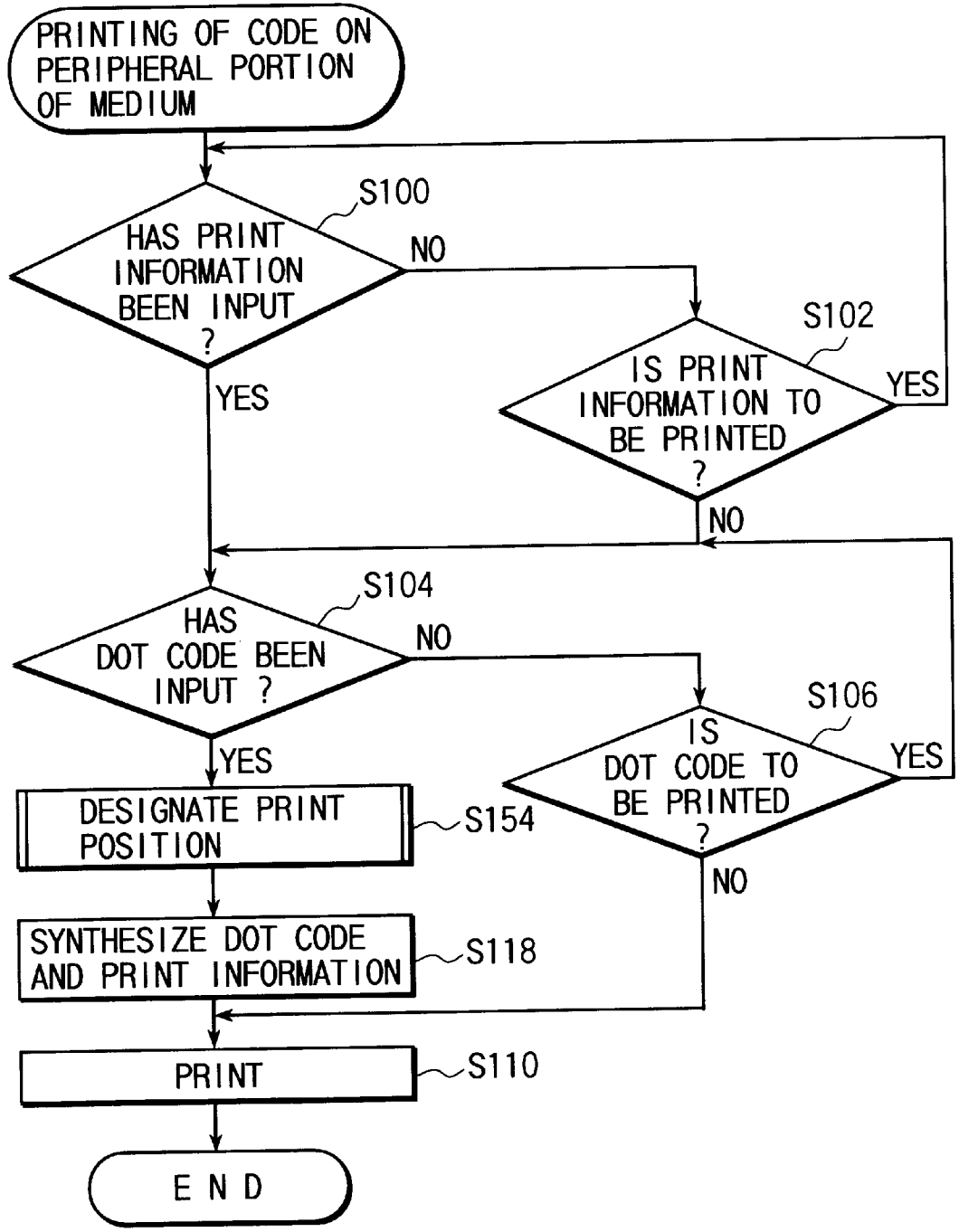
FIG. 23 is a flow chart illustrating the operation of a code printing apparatus according to the eighth embodiment of the invention.

FIG. 23 is a flow chart illustrating the operation of the system controller 116 in the ninth embodiment. The operation steps common to those in the first embodiment are denoted by like reference numerals in FIG. 6.

Specifically, like the first embodiment, it is determined in steps S100 to S106 whether print information and a dot code are input and to be printed. If it is determined in step S104 that the dot code has been input, the print position of the dot code is designated on the basis of a user-set print position set in the print-position user setting unit 188 (step S154). The dot code and sheet print information are synthesized so that the dot code may be printed on the designated print position (step S118). The synthesized information is printed out by the printer 122 (step S110).

Figure 24:
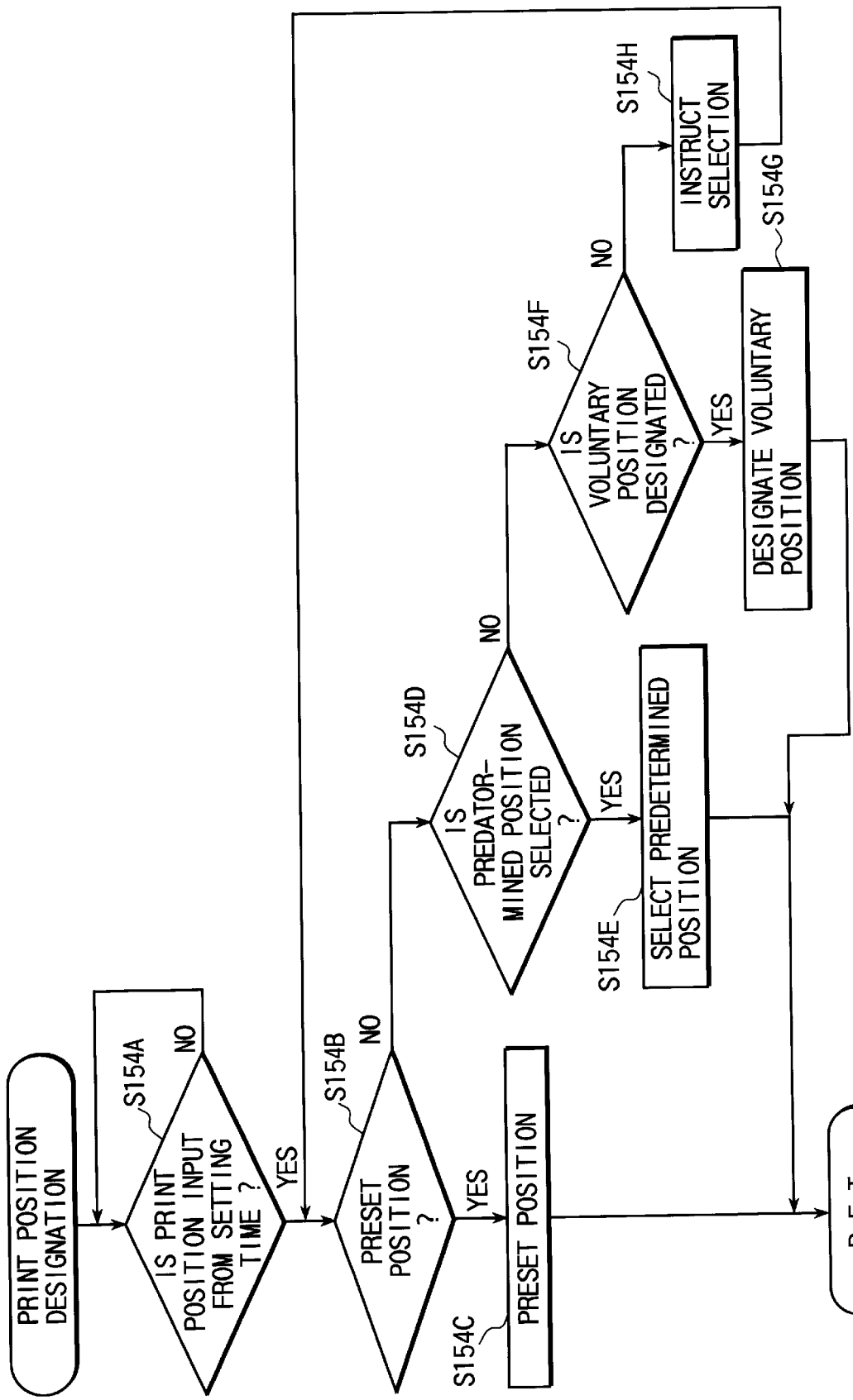
FIG. 24 is a flow chart illustrating a process of designating a print position in FIG. 23.

The print position designation process in step S154 is carried out, as illustrated in FIG. 24.

The input of data from the print-position user setting unit 188 is awaited (step S154A). If data is input, it is determined whether the input data represents the preset position (step S154B). If the input data represents the preset position, this preset position is determined as the print position (step S154C) and the control goes to step S118.

On the other hand, if the input data from the print-position user setting unit 188 does not represent the preset position, it is then determined whether the input data is predetermined-position selection data input by the switch (step S154D). If "YES" in step S154D, the predetermined position selected by the switch is selected as print position (step S154E) and the control advances to step S118.

If the input data is not the predetermined-position selection data, it is then determined whether the input data is voluntary-position designation data (step S154F). If "YES" in step S154F, the voluntary designation position is designated as print position (step S154G) and the control goes to step S118.

If the input data is not the voluntary-position designation data, the user is instructed to make selection by means of the LCD (step S154H), and the control returns to step S154B.

As has been described above, the data layout can be freely set by the user. Therefore, the dot code can be exactly printed.

[Tenth Embodiment]

A tenth embodiment of the present invention will now be described. In the tenth embodiment, the dot code print position is set by reading a position detection medium.

Figure 25:
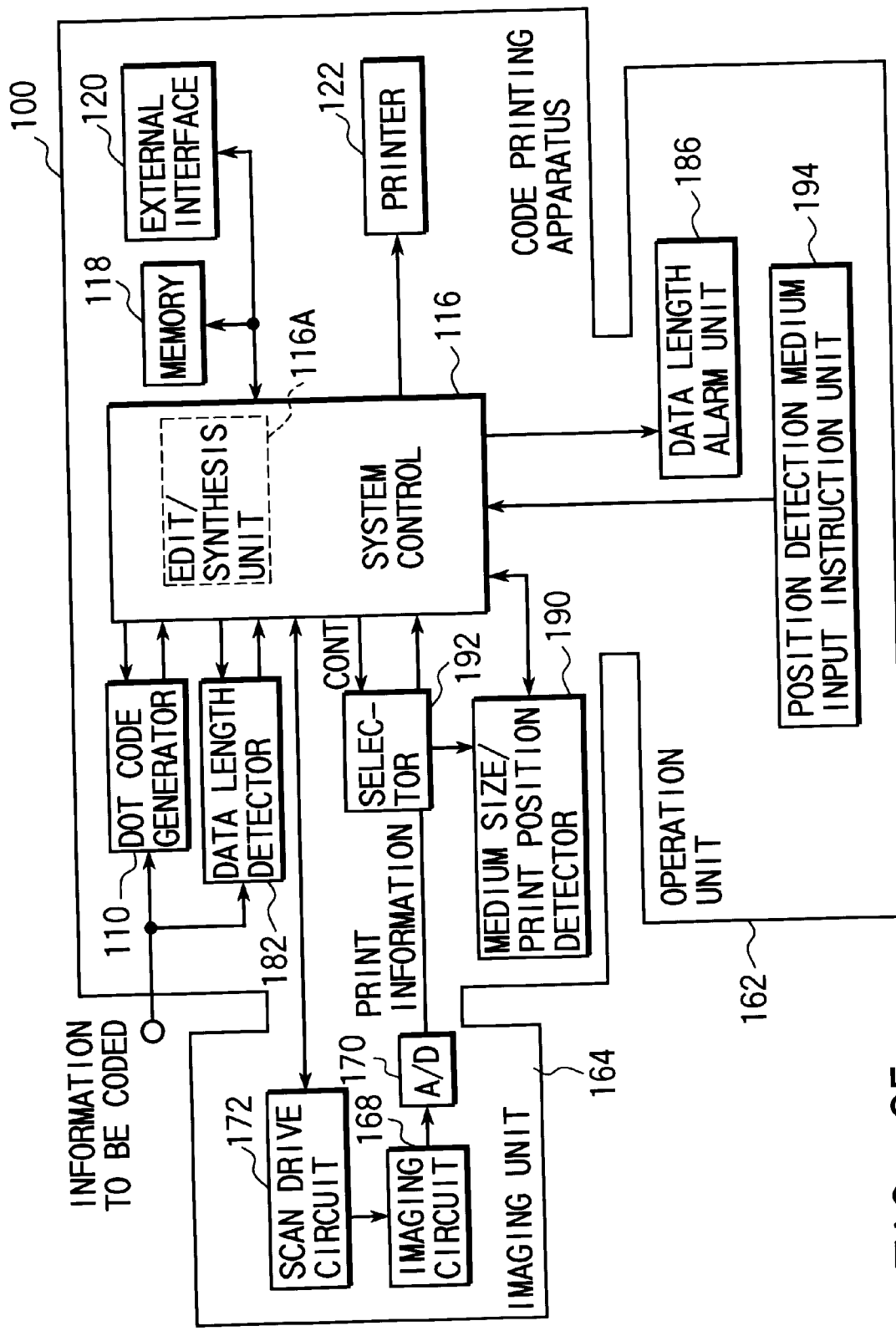
FIG. 25 is a block diagram showing a code printing apparatus according to a tenth embodiment of the present invention.

FIG. 25 is a block diagram showing the structure of the tenth embodiment. The structural elements common to those in FIG. 7 relating to the second embodiment are denoted by like reference numerals. Specifically, in the code printing apparatus 100 of the tenth embodiment, the medium size/periphery detector 160 in the second embodiment is replaced with a print size/print position detector 190. A selector 192 is also provided for supplying an output from the A/D converter 170 selectively to one of the medium size/print position detector 190 and system controller 116. The selector 192 is controlled by a control signal CONT from the system controller 116. The operation unit 162 is provided with a position detection medium input instruction unit 194 in place of the print sheet size designation unit 166 in the second embodiment. In addition, there are provided a data length detector 182 and a data length alarm unit 186, which were described in connection with the seventh embodiment.

If the reading of the position detection medium is instructed by the position detection medium input instruction unit 194, the system controller 116 controls the scan drive circuit 172 and selector 192, thus enabling the imaging circuit 168 to image the position detection medium and delivering the output of the A/D converter 170 to the medium size/print position detector 190. Thereby, the print position of the dot code is detected. The data length detector 182 and data length alarm unit 186 are provided to determine whether the dot code falls within the detected dot code print position and to issue an alarm when the dot code does not fall within the detected dot code print position.

FIGS. 26A to 26F show position detection mediums 196 on which code position designation marks, indicating positions where the dot codes are to be printed, are printed. Specifically, in the position detection medium 196 shown in FIG. 26A, four black dots are printed at four corners of the print position. In the position detection medium 196 shown in FIG. 26B, a rectangle indicating a print area is printed. In the position detection medium 196 shown in FIG. 26C, two straight lines indicating the upper and lower positions of the print area are printed. In the position detection medium 196 shown in FIG. 26D, a vertical line indicating the left position of the dot code is printed. In the position detection medium 196 shown in FIG. 26E, a triangle indicating the left position of the dot code and the direction of printing of the code is printed. In the position detection medium 196 shown in FIG. 26F, a left-hand inverted L indicating the upper left position of the dot code is printed.

Figures 26A, 26B, 26C:
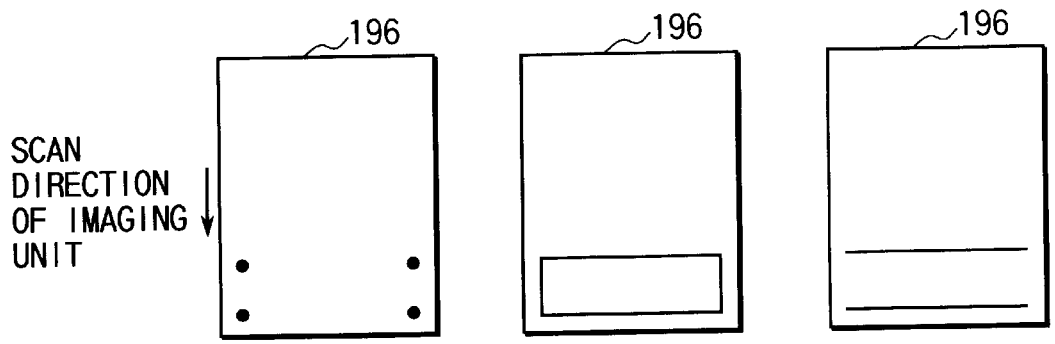
FIGS. 26A to 26F show position detection media for use in the tenth embodiment of the invention.
Figures 26D, 26E, 26F:
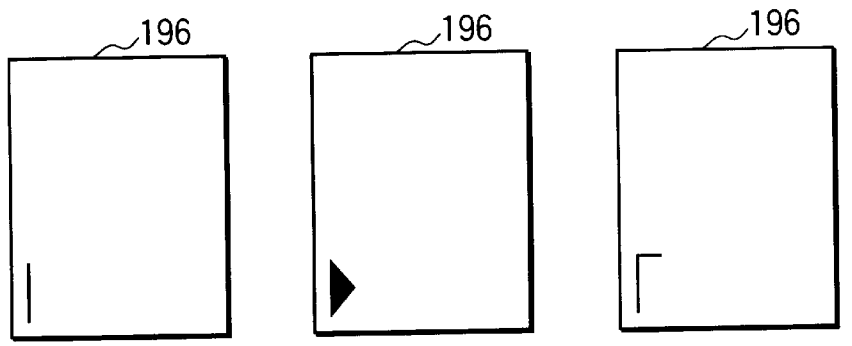
Figure 27:
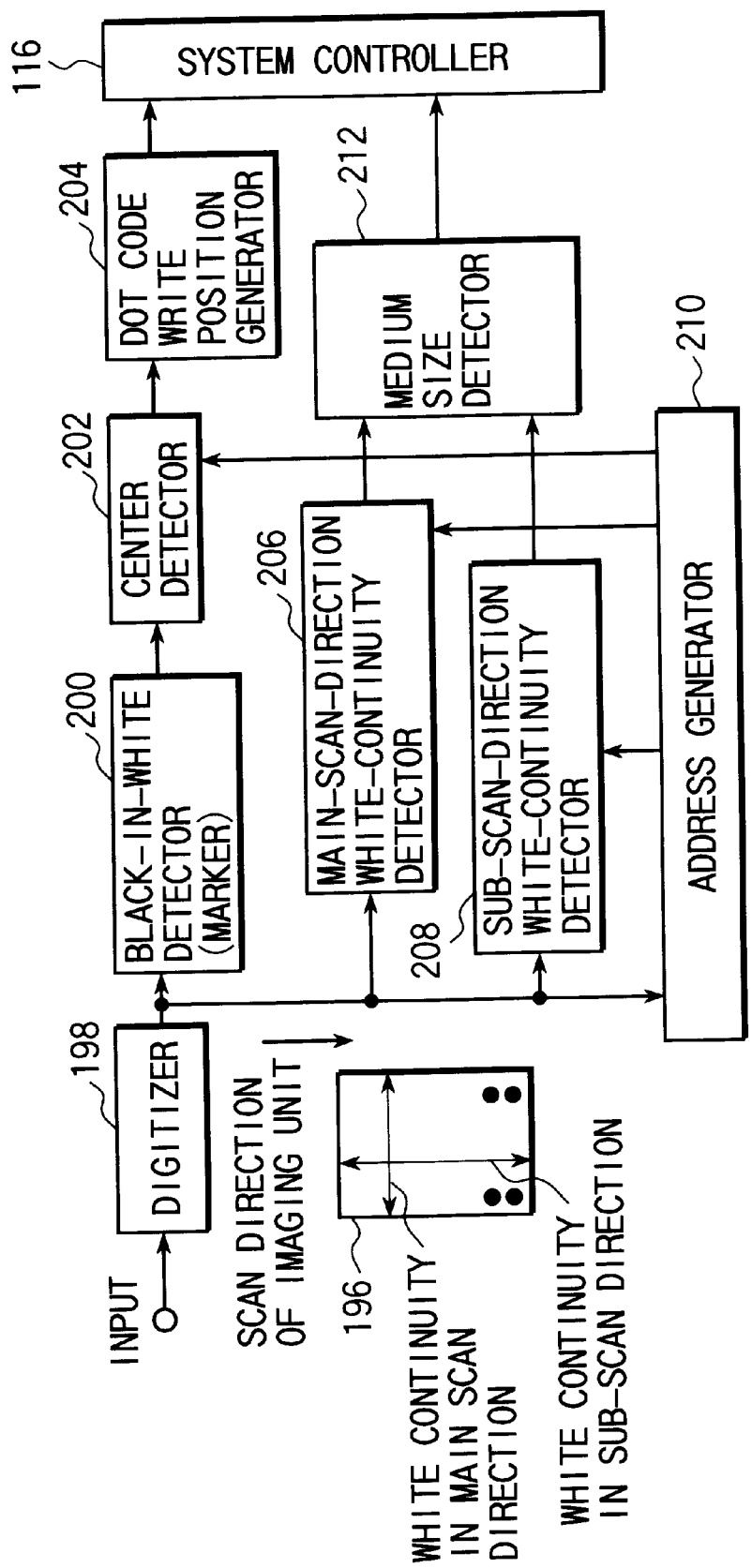
FIG. 27 is a block diagram showing a structure of a medium size/print position detection unit in FIG. 25.

FIG. 27 shows the structure of the medium size/print position detector 190. Suppose that the medium size/print position detector 190 reads the position detection medium shown in FIG. 26A.

The medium size/print position detector 190 comprises a digitizer 198, a black-in-white detector 200, a center detector 202, a dot code write position generator 204, a main-scan-direction white-continuity detector 206, a sub-scan-direction white-continuity detector 208, an address generator 210, and a medium size detector 212.

The digitizer 198 digitizes a signal input from the A/D converter 170 via the selector 192. The black-in-white detector 200 detects a black-in-white. The center detector 202 detects the center of the detected black, i.e. black dots. The dot code write position generator 204 determines, as a dot code write position, an area defined by connecting the detected centers of the black dots, and delivers the determined data to the system controller 116. A detailed description of the black-in-white detector 200 and center detector 202 is omitted, since the techniques of marker detection and center detection, as disclosed in EP 0,670,555 A1 (corresponding to U.S. Ser. No. 08/407,018, now U.S. Pat. No. 5,896,403, issued Apr. 20, 1999), are applicable to these detectors 200 and 202.

The main-scan-direction white-continuity detector 206 and sub-scan-direction white-continuity detector 208 detect the length of the white-continuity in the main scan direction and sub-scan direction by means of digital signals. The length of white-continuity, in this context, refers to a maximum value of white continuity detected from the periphery of the medium. As is shown in FIG. 27, the main scan direction refers to the transverse direction of the position detection medium 196 and the sub-scan direction refers to the longitudinal direction of the medium 196. The medium size detector 212 detects the sheet size of the medium on the basis of the lengths of white-continuity in the main and sub-directions, which have been detected by the main-scan-direction white-continuity detector 206 and sub-scan-direction white-continuity detector 208. The data on the detected sheet size is delivered to the system controller 116.

In synchronism with digital signals output from the digitizer 198, the address generator 210 supplies address signals to the center detector 202, the main-scan-direction white-continuity detector 206 and sub-scan-direction white-continuity detector 208.

Figure 28:
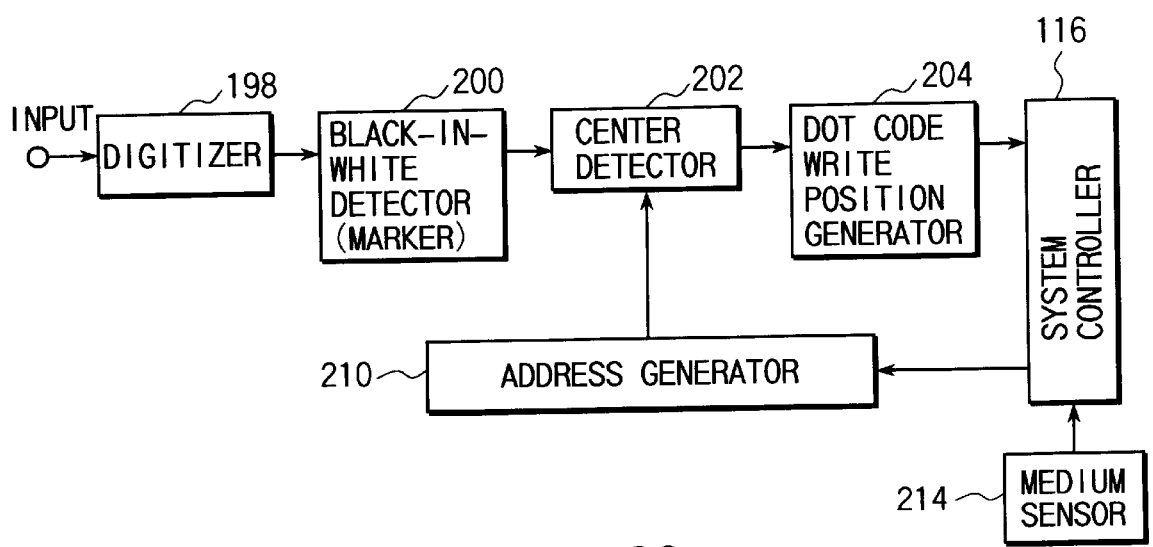
FIG. 28 is a block diagram showing another structure of the medium size/print position detection unit in FIG. 25.

The main-scan-direction white-continuity detector 206, sub-scan-direction white-continuity detector 208 and medium size detector 212 may be omitted, as shown in FIG. 28, if a method of detecting the size of an original sheet by means of a sensor, which method is widely applied to copying machines, is used as a medium size detection method. Specifically, a medium sensor 214 senses the size of the medium and delivers the sensed result to the system controller 116.

Figure 29:
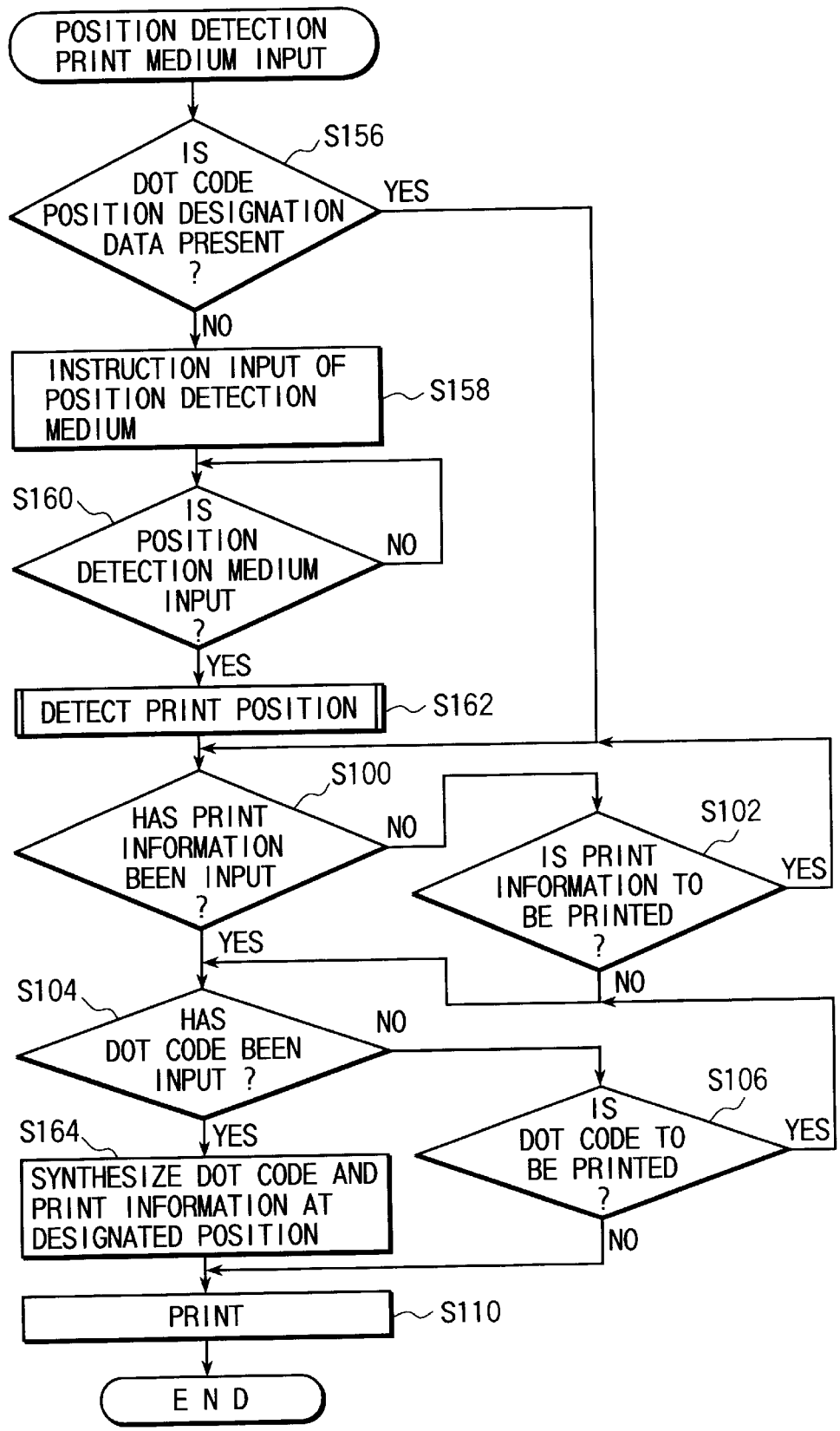
FIG. 29 is a flow chart illustrating the operation of a code printing apparatus according to the tenth embodiment of the invention.

FIG. 29 is a flow chart illustrating the operation of the present embodiment. The system controller 116 determines whether dot code position designation data is present, i.e. whether the position detection medium 196 was input previously (step S156).

If the dot code position is not designated, the user is instructed to input the position detection medium by means of an LCD (not shown) (step S158) and the input of the position detection medium is awaited (step S160).

If the user has input data indicating that the position detection medium 196 is set in the code printing apparatus 100, by operating the position detection medium input instruction unit 194, the system controller 116 controls the imaging unit 164, medium size/print position detector 190 and selector 192 and detects the dot code print position from the position detection medium 196 (step S162).

If the print position has been detected or it has been determined in step S156 that the dot code position designation data is present, it is confirmed, like steps S100 to S106, whether the print information and dot code are input or are to be printed. If it is determined in step S104 that the dot code has been input, the dot code and sheet print information are synthesized so that the dot code may be located in the print position detected in step S162 or in the print position represented by the position designation data which is determined to be present in step S156 (step S164). The synthesized information is printed out by the printer 122 (step S110).

Figure 30:
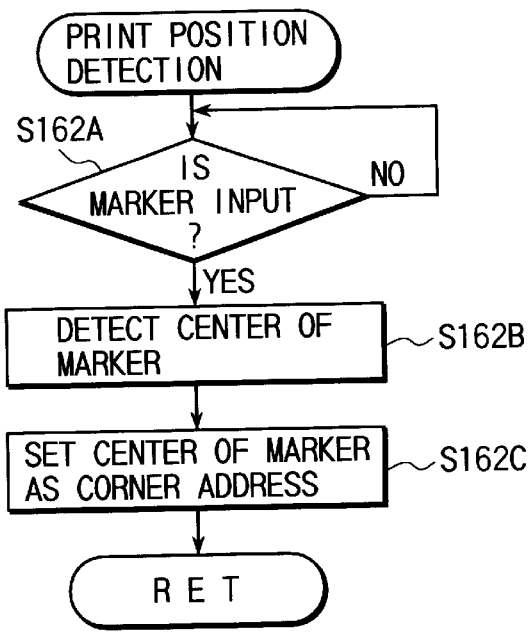
FIG. 30 is a flow chart illustrating a process of detecting a print position in the process illustrated in FIG. 29, in the case of using the position detection medium shown in FIG. 26A.

The print position detection step (step S162) is carried out, as illustrated in FIG. 30. In the present embodiment, the method for marker detection and center detection disclosed in EP 0,670,555 A1 (U.S. Ser. No. 08/407,018, now U.S. Pat. No. 5,896,403, issued Apr. 20, 1999) is used. Thus, the following description will be set forth, regarding the four black dots on the position detection medium 196 shown in FIG. 26A as being markers.

Specifically, the black-in-white detector 200 confirms whether the markers have been input (step S162A). If there are markers, the center detector 202 detects centers of the markers (step S162B). The dot code write position generator 204 determines the print position with the centers of markers set as corner addresses (step S162C).

If the four black dots on the position detection medium 196 are treated as markers, as described above, the print position can be detected with the same structure as is used for the dot code detection.

Figure 31:
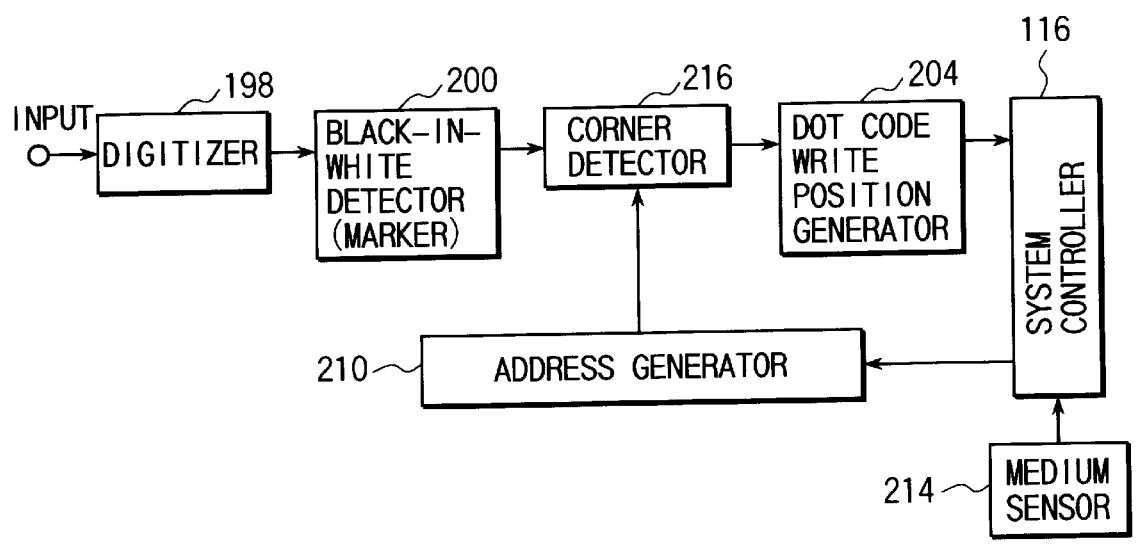
FIG. 31 is a block diagram showing still another structure of the medium size/print position detection unit in FIG. 25.

FIG. 31 shows, in comparison with the structure in FIG. 28, the structure of the medium size/print position detector 190 using the position detection medium 196 shown in FIG. 26B. In this case, the center detector 202 is replaced with a corner detector 216. The corner detector 216 detects the four corners of a rectangle.

Figure 32:
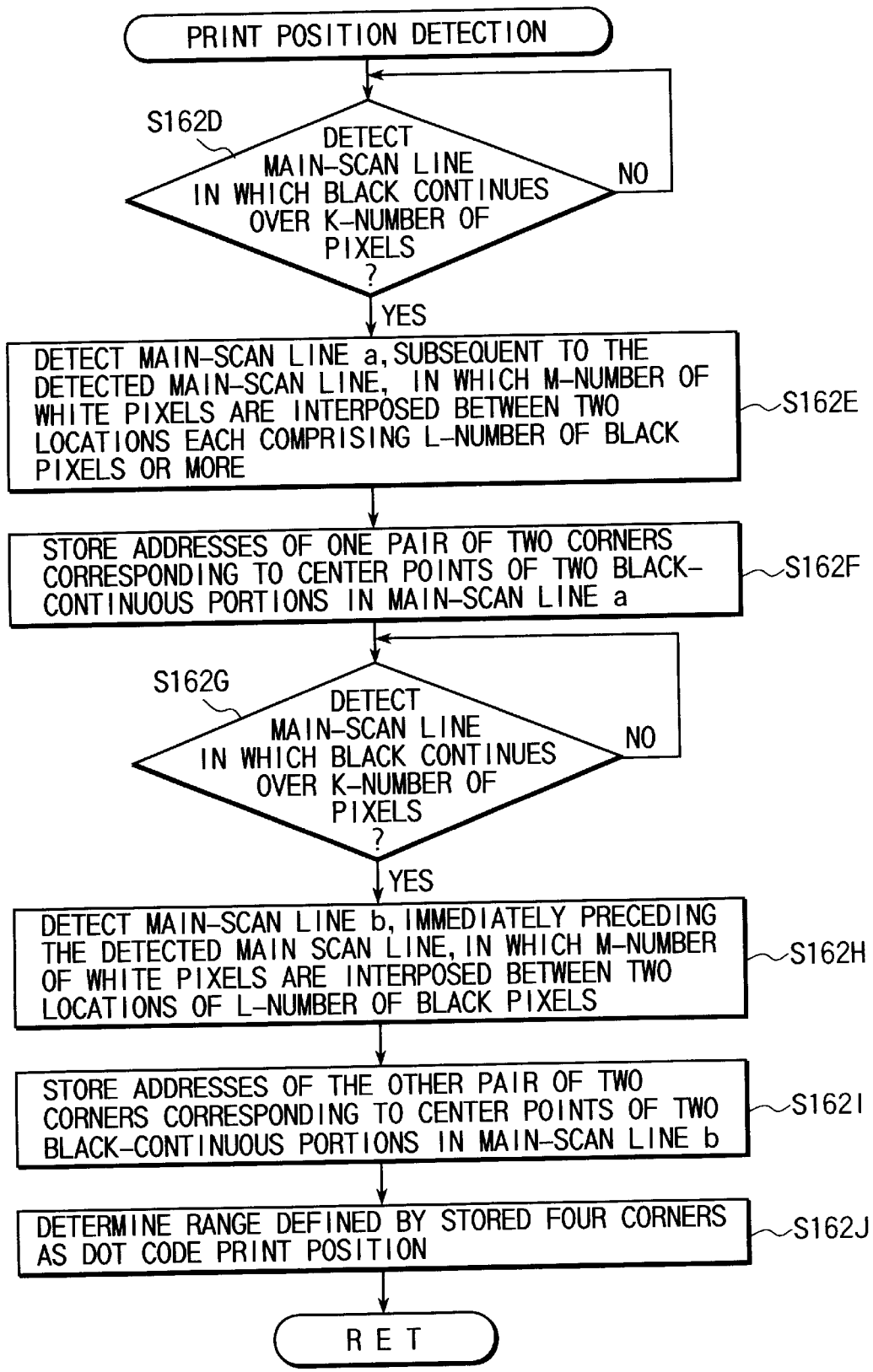
FIG. 32 is a flow chart illustrating a process of detecting a print position in the process illustrated in FIG. 29, in the case of using the position detection medium shown in FIG. 26B.

The print position detection step in step S162 is carried out, as illustrated in FIG. 32.

The control awaits the detection of a main-scan line in which black continues over a K-number of pixels (step S162D). If the main-scan line has been detected in step S162D, a main-scan line a, which is subsequent to the detected main-scan line wherein an M-number of white pixels are interposed between two locations each comprising an L-number of black pixels or more, is detected (step S162E). Addresses of one pair of two corners corresponding to center points of two black-continuous portions in the main-scan line a are stored (step S162F).

Figure 33:
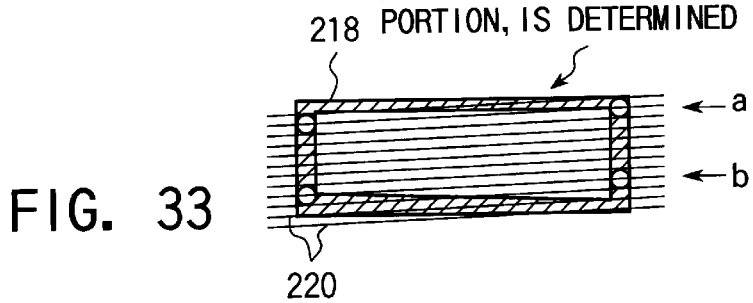
FIG. 33 shows a relationship between a code position designation mark and a scan line, illustrating the respective processes in the flow chart of FIG. 32.

As is shown in FIG. 33, if an uppermost main-scan line 220 of a rectangular code position designation mark 218 is determined to be a main-scan line in which black continues over a K-number of pixels, a main-scan line, which is subsequent to the detected main-scan line wherein an M-number of white pixels are interposed between two locations each comprising an L-number of black pixels or more, is determined to be a main-scan line a. In this example, the main-scan line a is the second main-scan line from above. The L-number of pixels are determined on the basis of the width of a vertical line constituting a part of the rectangle of the code position designation mark 218. The center points of two black continuous portions on the main-scan line a are determined to be one pair of two corners, as indicated by circles in FIG. 33.

Thereafter, similarly, the control awaits the detection of a main-scan line in which black continues over a K-number of pixels (step S162G). If the main-scan line has been detected in step S162G, a main-scan line b, which is immediately before the detected main-scan line wherein an M-number of white pixels are interposed between two locations each comprising an L-number of black pixels or more, is detected (step S162H). Addresses of the other pair of two corners corresponding to center points of two black-continuous portions in the main-scan line b are stored (step S162I).

The range defined by the stored addresses of the four corners is determined to be a dot code print position (step S162J).

Figure 34:
FIG. 34 is a view for describing a line width of a code position designation mark.

It is desirable that the line of the code position designation mark 218 have such a width as to cross the entire main-scan line from end to end even if the main-scan line is inclined, as shown in FIG. 34.

Similarly, when the position detection media shown in FIGS. 26C to 26F are used, the medium size/print position detector 190 needs to have the structure and perform the processing, which are suitable for the respective media 196.

On the position detection media 196 shown in FIGS. 26A to 26F, the code position designation marks are printed. Instead, the user may attach seals with such code position designation marks to blank media. Thus, a dot code print position may be set at a desired part of the medium.

Figure 35A:
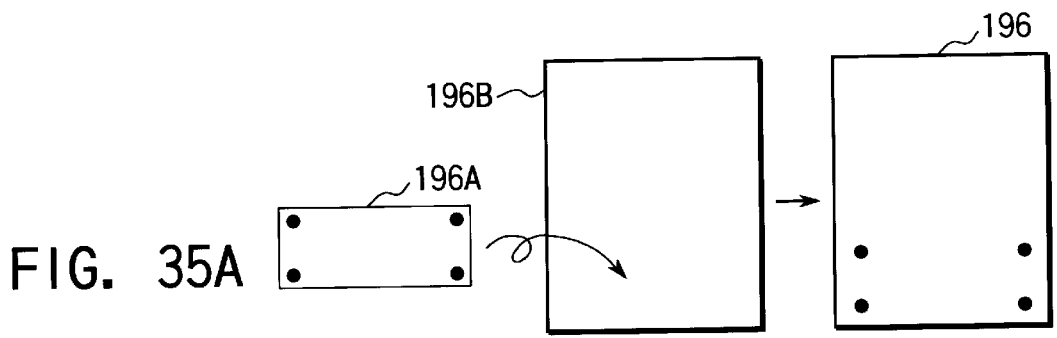
FIG. 35A illustrates how a position detection medium is formed by attaching a seal, on which a code position designation mark is printed, on a white medium.
Figure 35B:
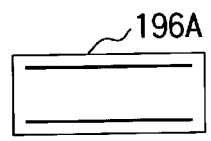
FIGS. 35B to 35F show other examples of the seal.
Figure 35C:
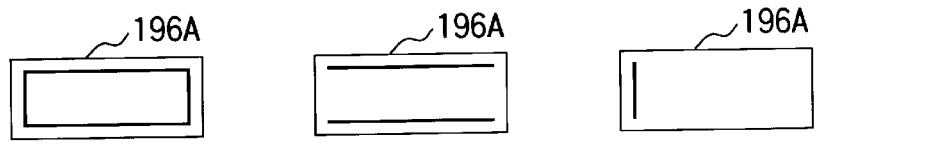
Figure 35D:
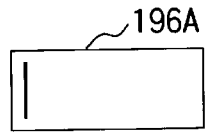
Figure 35E:
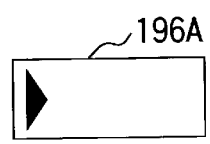
Figure 35F:
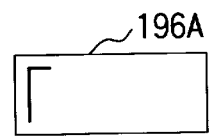
Figure 35G:
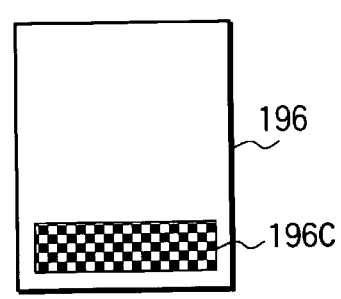
FIG. 35G shows a position detection medium on which a dummy dot code is used as a code position designation mark.

Specifically, a seal 196A with a printed code position designation mark is attached to a blank medium 196B, as shown in FIG. 35A, and thus a position detection medium 196 can be formed. Seals as shown in FIGS. 35B to 35F may be used as such seal 196A.

The code position designation mark shown in FIG. 26A may be replaced with a dot code 196C having dummy data, as shown in FIG. 35. Markers 14 at the four corners of the dot code 196C may be regarded as code position designation marks.

[Eleventh Embodiment]

An eleventh embodiment of the present invention will now be described. In this embodiment, a code print position detection sensor is provided separately from the imaging circuit 168.

Figure 36:
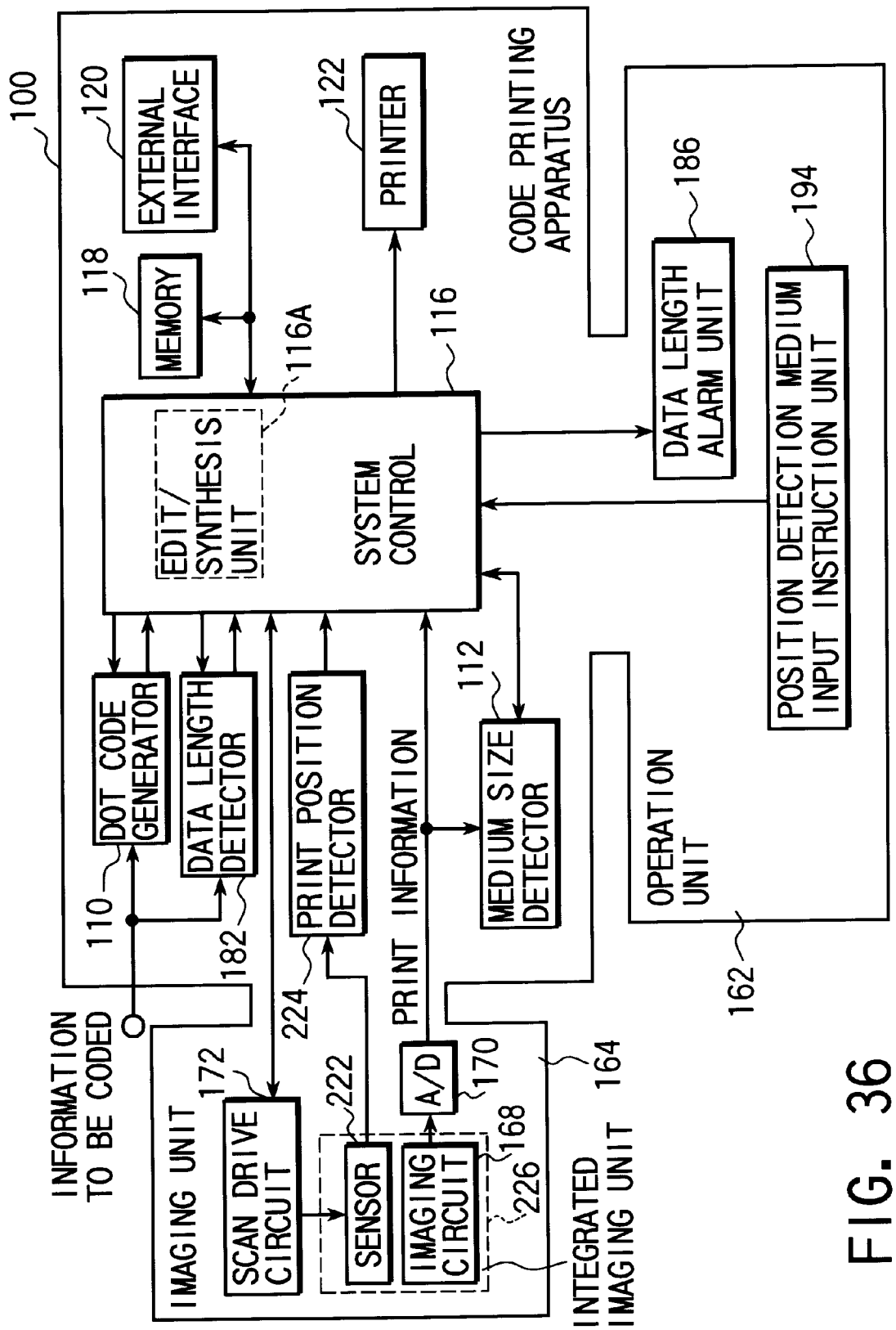
FIG. 36 is a block diagram showing a code printing apparatus according to an eleventh embodiment of the present invention.

FIG. 36 is a block diagram showing the structure of the code printing apparatus 100 according to this embodiment. The structural elements common to those in FIG. 25 relating to the tenth embodiment are denoted by like reference numerals. Specifically, in the code printing apparatus 100 of the present embodiment, the medium size/print position detector 190 and selector 192 in the tenth embodiment are replaced with a medium size detector 112 for detecting a medium size. The code print position is detected by a position detection sensor 222 integrated with the imaging circuit 168 and a print position detector 224 receiving an output from the sensor 222.

Figure 37A:
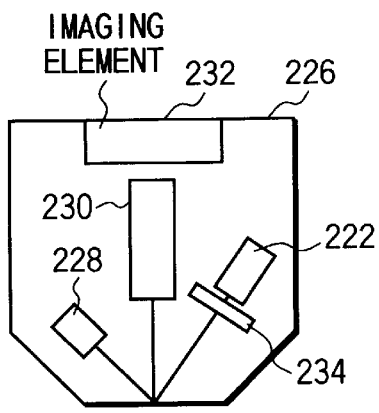
FIGS. 37A and 37B show imaging members wherein an imaging circuit and a position detection sensor shown in FIG. 36 are integrated.

An integrated imaging unit 226 comprising the imaging circuit 168 and sensor 222 may be constructed, as shown in FIG. 37A. Specifically, an illuminator 228 illuminates a print medium 158 to be read. Reflection light from the print medium 158 is guided to an imaging element 232 via a lens 230. Reflection light from a position detection medium 196 is guided to a position sensor 222 via a filter 234. Sheet print information on the print medium 158 to be read and cord position designation marks on the position detection medium 196 have different colors so that both can be distinguished. The filter 234 serves to separate a specific color and the position sensor 222 detects the separated color.

Figure 37B:
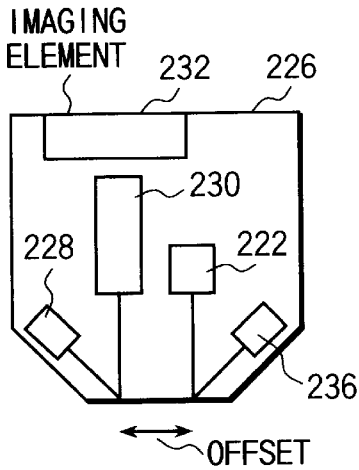

The integrated imaging unit 226 may have, in place of the filter 234, a position detection light source 236 different from the illuminator 228 as shown in FIG. 37B. Although the imaging position varies in this case, an offset of the image position is corrected by the print position detector 224. With this structure, the code position designation mark on the position detection medium 196 can be printed in stealth ink, whereby the code position designation mark can be made first visible when illuminated with ultraviolet or infrared light. The structure shown in FIG. 37B is easier to manufacture, than that shown in FIG. 37A, since the imaging element 232 and sensor 222 can be positioned individually with respect to the illuminators.

In the structure of the present embodiment wherein the integrated imaging unit 226 is used, the print medium 158 to be read can be used as a position detection medium by printing the code position designation mark on the print medium 158 in a different color or in stealth ink, or attaching such a seal of mark on the print medium 158. In this case, the position detection medium input designation unit 194 may be dispensed with.

[Twelfth Embodiment]

A twelfth embodiment of the present invention will now be described. In this embodiment, when sheet print information on the print medium 158 is read, a blank position on the medium 158 is detected and a dot code is printed on the blank position.

Figure 38:
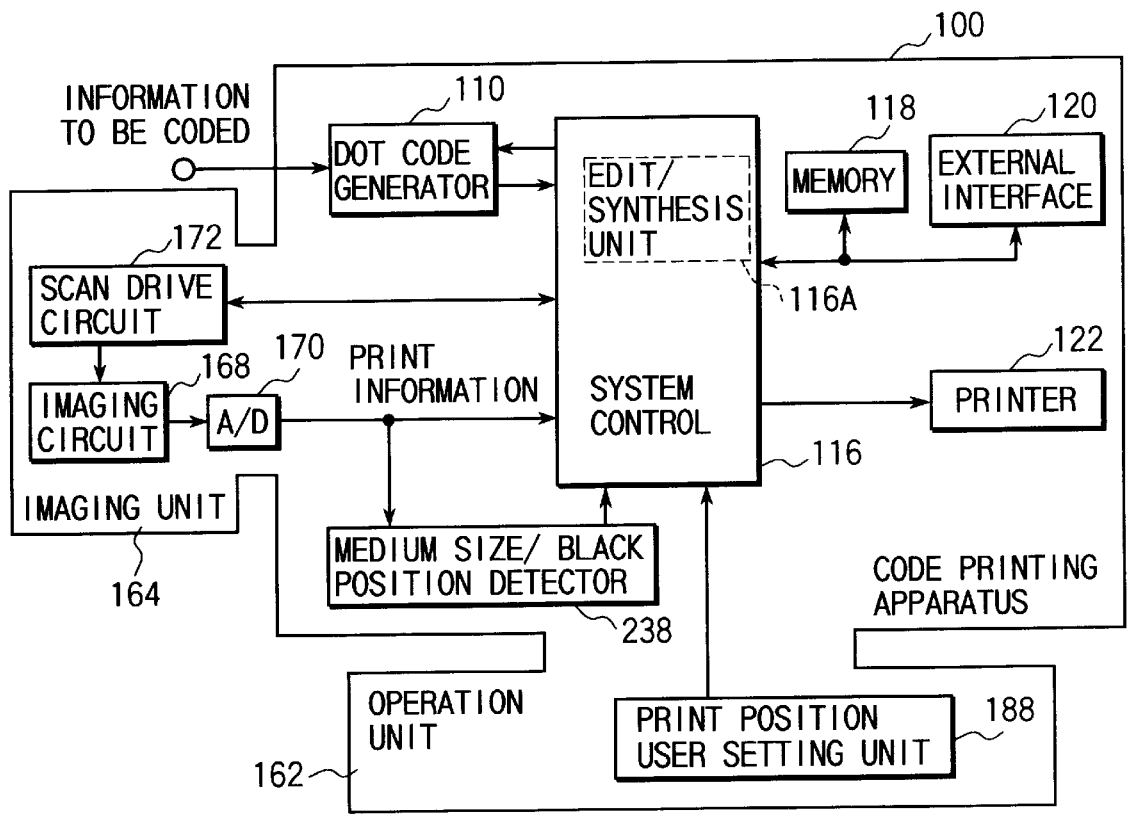
FIG. 38 is a block diagram showing a code printing apparatus according to a twelfth embodiment of the present invention.

FIG. 38 is a block diagram showing the structure of the twelfth embodiment. The structural elements common to those in FIG. 4 showing the first embodiment are denoted by like reference numerals. In the code printing apparatus 100 of this embodiment, the medium size detector 112 in the first embodiment is replaced with a medium size/blank position detector 238. An imaging unit 164 comprising an imaging circuit 168, an A/D converter 170 and a scan drive circuit 172 is added. The print position setting unit 114 is replaced with an operation unit 162 including a print-position user setting unit 188. The medium size/blank position detector 238 detects a medium size as well as a blank position. The print-position user setting unit 188 is provided in order to enable the user to freely determine which portion of the blank position detected by the medium size/blank position detector 238 is used as a dot-code print position.

Figure 39:
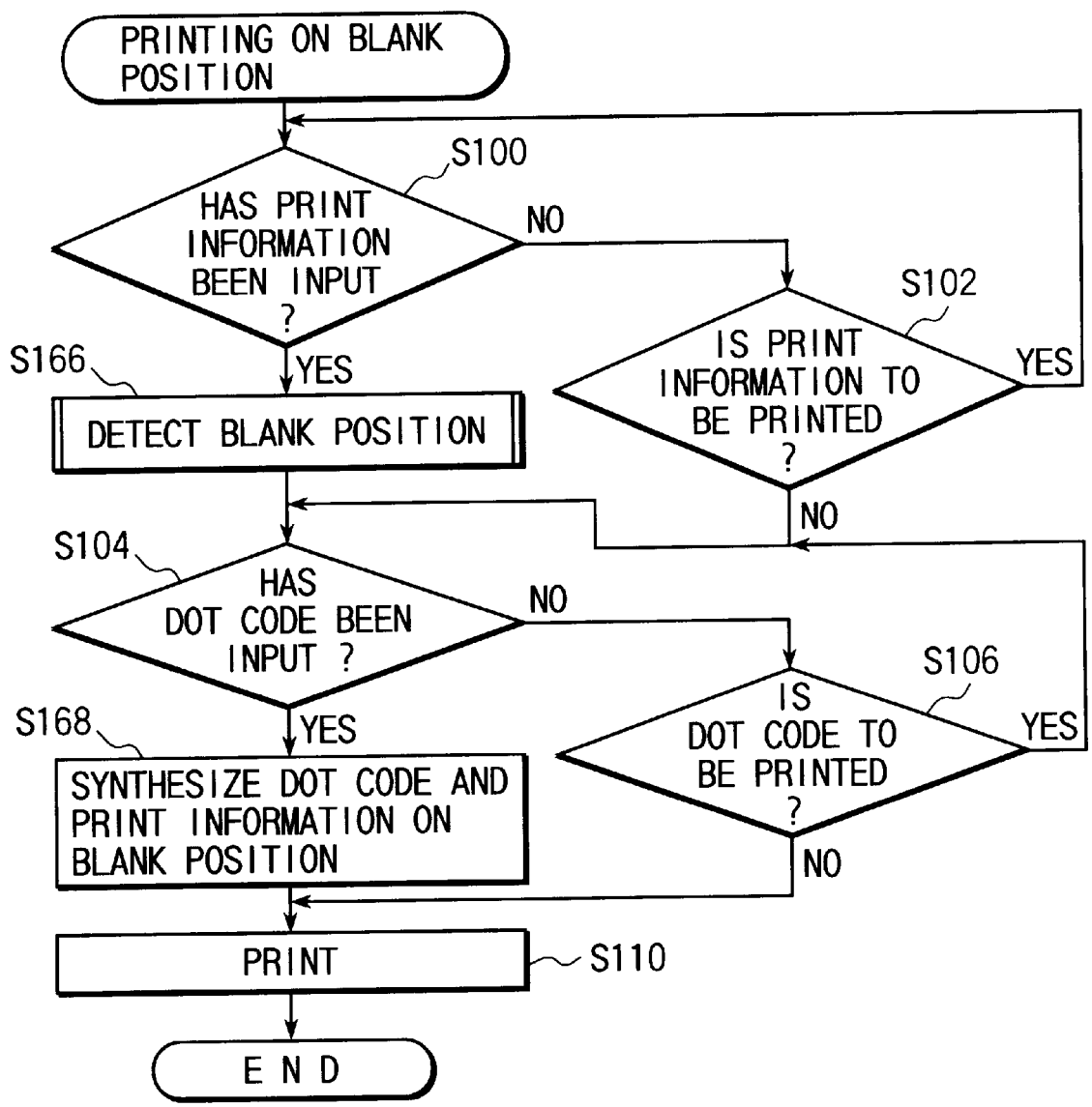
FIG. 39 is a flow chart illustrating the operation of a code printing apparatus according to the twelfth embodiment of the invention.

FIG. 39 is a flow chart illustrating the operation of the system controller 116 in the twelfth embodiment. The operation steps similar to those in FIG. 6 relating to the first embodiment are denoted by like reference numerals.

It is determined whether sheet print information has been input (step S100). If sheet print information has not been input, it is determined whether sheet print information is to be printed (step S102). When the sheet print information is to be printed, the control returns to step S100 to await the input thereof.

If it is determined in step S100 that the sheet print information has been input, a blank position is detected (step S166). Then, or if it is determined in step S102 that no sheet print information is to be printed, it is confirmed whether image information of a dot code has been input from the dot code generator 110 (step S104). If no dot code has been input, it is confirmed whether a dot code is to be printed (step S106). When the dot code is to be printed, the control returns to step S104 to await the input thereof.

If the input of the dot code has been confirmed in step S104, the dot code and sheet print information are synthesized (step S168) so that the dot code is to be printed on that part of the blank position detected by step S166, which is designated by the user through the print-position user setting unit 188. The synthesized result is printed out by the printer 122 (step S110).

If it is determined in step S106 that no dot code is to be printed, the control goes to step S110 and the input sheet print information is printed out by the printer 122. Needless to say, if it is determined in step S102 that no print information is to be printed, a determination step is provided in step S110 and the present process is finished without printing. The same applies to flow charts to be described below.

Figure 40:
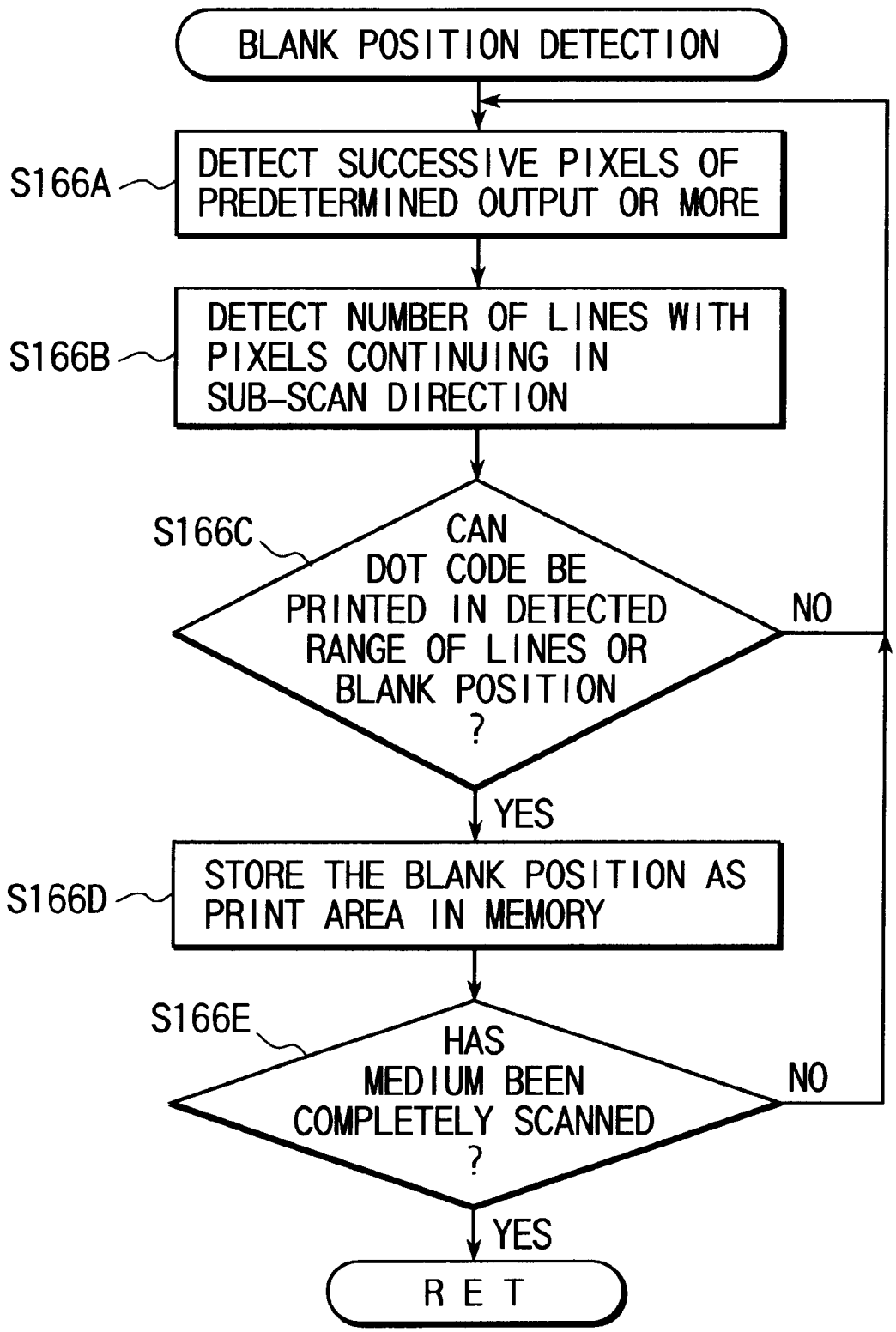
FIG. 40 is a flow chart illustrating a process of detecting a blank position in FIG. 39.

The blank position detection process in step S166 is carried out, as illustrated in FIG. 40.

A white continuous portion or successive pixels of a predetermined output or more on scan lines are detected (step S166A), and the number of lines in the sub-scan direction is detected. Thereby, the range or size of a blank area is detected (step S166B). It is then determined whether the dot code can be printed within the detected range (step S166C). Since the dot code has a predetermined size, the longitudinal and transverse lengths of the dot code are compared with the detected range. If the dot code cannot be printed, the control returns to step S166A to search for another blank area.

On the other hand, if the dot code can be printed, the information on the detected blank position or blank area is stored in the memory 118 as a print area (step S166D). It is confirmed whether the print medium 158 has been entirely scanned (step S166E). If not, the control returns to step S166A to search for another blank area.

If the print medium 158 has been entirely scanned, the control goes to step S104.

As has been described above, since the blank position is detected and the dot code can be printed on the blank position, the sheet surface can be efficiently used.

[13th Embodiment]

A 13th embodiment of the present invention will now be described. In this embodiment, a dot code is used as the code position designation information in the tenth embodiment.

Specifically, a print position designation dot code is printed as part of sheet print information on the print medium 158, or printed on the position detection medium 196. The print position designation dot code is read and decoded, thereby to determine the print position of a dot code which is synthesized with sheet print information.

Figure 41:
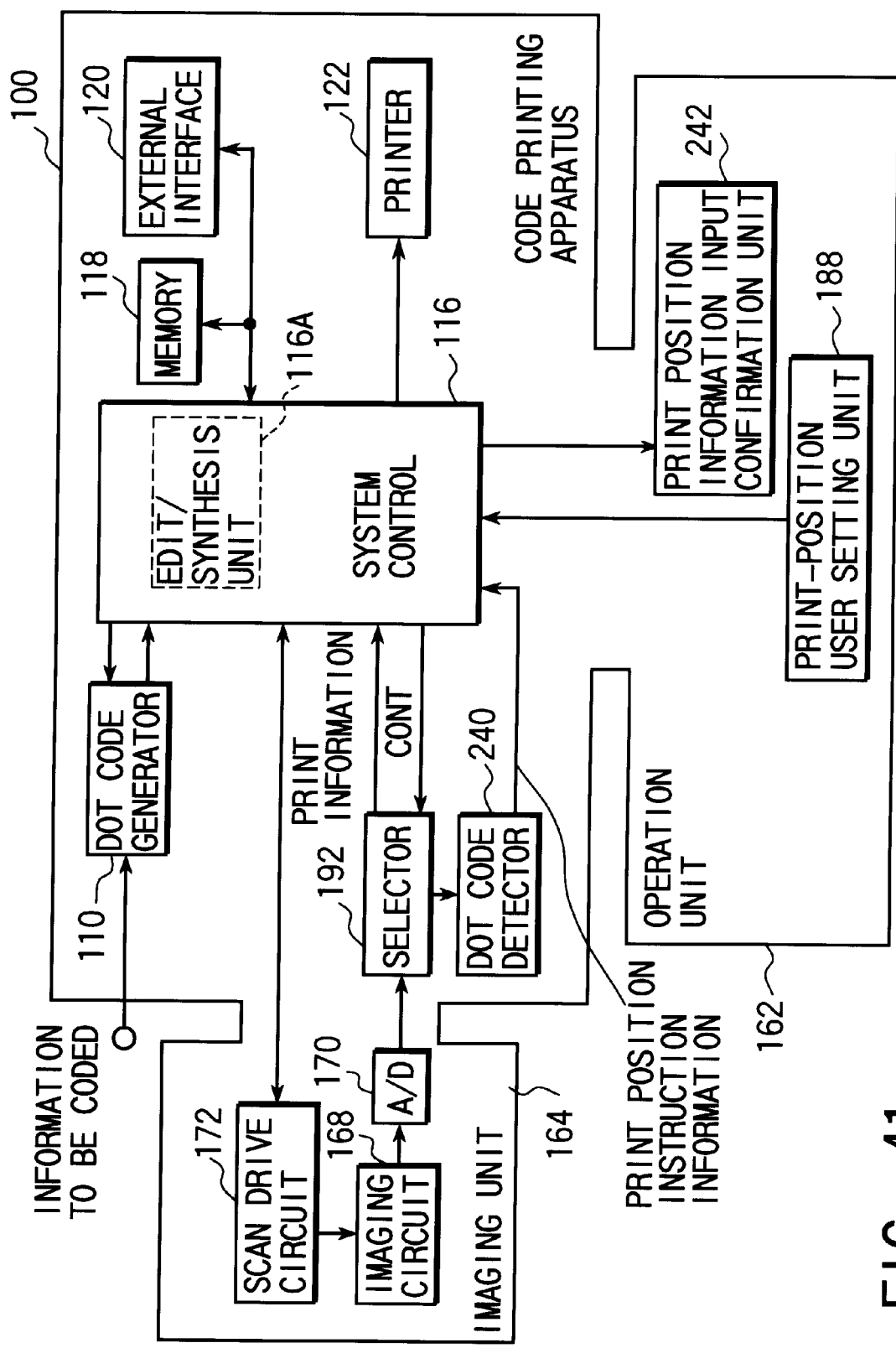
FIG. 41 is a block diagram showing a code printing apparatus according to a 13th embodiment of the present invention.

FIG. 41 is a block diagram showing the structure of the 13th embodiment. The structural elements common to those in FIG. 25 relating to the tenth embodiment are denoted by like reference numerals. In the code printing apparatus 100 of the 13th embodiment, the medium size/print position detector 190 in the tenth embodiment is replaced with a dot code decoder 240, and the position detection medium input instruction unit 194 is replaced with a print-position user setting unit 188. In addition, a print position information input confirmation unit 242 comprising an LCD, etc. is provided in the operation unit 162.

The dot code detector 240 decodes the dot code from the imaging data delivered from the A/D converter 170 via the selector 192. The details of the dot code detector 240 is disclosed, for example, in EP 0,670,555 A1 (corresponding to U.S. Ser. No. 08/407,018, now U.S. Pat. No. 5,896,403, issued Apr. 20, 1999), and so a description thereof is omitted.

Where the position detection medium 196 with a printed print position instruction dot code is used, the print-position user setting unit 188 is used to switch the selector 192 onto the dot code decoder 240 side. Alternatively, where the print medium 158 on which the print position instruction dot code is printed as part of sheet print information is used, the print-position user setting unit 188 is used to instruct the print position of the print position instruction dot code or to instruct a pre-scan to discriminate a portion of sheet print information, in which the print position instruction dot code is assigned.

The print position information input confirmation unit 242 is used to display various confirmation information for the user.

Figure 42:
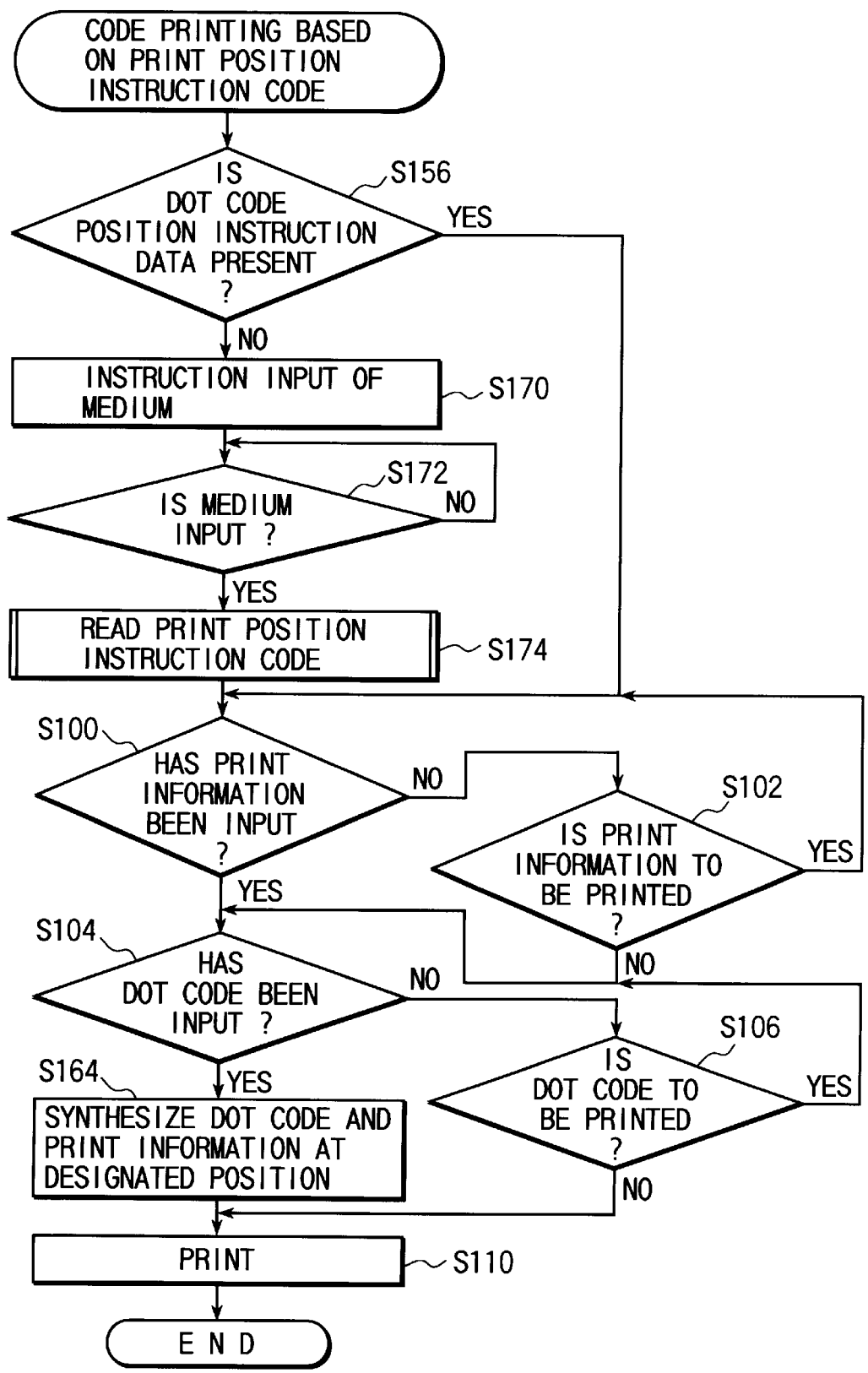
FIG. 42 is a flow chart illustrating the operation of a code printing apparatus according to the 13th embodiment of the invention.

FIG. 42 is a flow chart illustrating the operation of the system controller 116 in the 13th embodiment. The operation steps common to those illustrated in FIG. 29 relating to the tenth embodiment are denoted by like reference numerals.

The system controller 116 determines whether the position of the dot code is designated in advance (step S156). If the position of the dot code is not designated, the print position information input confirmation unit 242 instructs the user to input the position detection medium 196, on which the print position instruction dot code is printed, or the print medium 158 on which the print position instruction dot code is printed as part of the sheet print information (step S170). Then the input of the medium is awaited (step S172). If the medium is set, the system controller 116 controls the imaging unit 164, dot code decoder 240 and selector 192, and reads and decodes the print position instruction dot code printed on the medium. Thereby, the print position of the dot code, which will be generated by the dot code generator 110, is detected (step S172).

If the print position is thus detected or if the presence of the dot code position instruction data is determined in step S156, it is confirmed, like steps S100 to S106 in the first embodiment, whether or not the print information and dot code are input or to be printed. If the input of the dot code is determined in step S104, the dot code and sheet print information are synthesized so that the dot code is located on the print position detected in step S174 or the print position indicated by the position designation data the presence of which was determined in step S156 (step S164). The synthesized data is printed out by the printer 122 (step S110).

Figure 43:
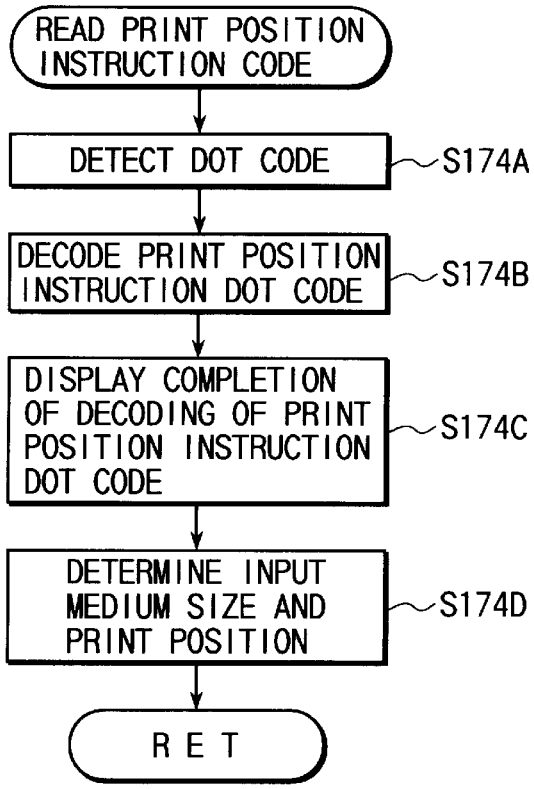
FIG. 43 is a flow chart illustrating a process of reading a print position designation dot code in the flow chart of FIG. 42.

The reading process for the print position instruction dot code in step S174 is carried out, as illustrated in FIG. 43.

An output from the A/D converter 170 is input to the dot code decoder 240 via the selector 192 to detect the dot code (step S174A). The detected dot code is decoded (step S174B). If the decoding is completed, the system controller 116 enables the print position information input confirmation unit 242 to display the completion of decoding (step S174C) and determines the size and print position of the input medium (step S174D). Then the control advances to step S100.

In step S174C, the print position information input confirmation unit 242 is made to display the completion of decoding of the print position instruction dot code. It is desirable, however, that the print position information input confirmation unit 242 is made to display, in addition to the completion of decoding, the result of decoding, i.e. the location of the print position, thereby instructing the user to instruct the validity of the print position through the print-position user setting unit 188.

If the print position is determined by decoding the dot code in the above-described manner, it becomes possible to perform complex print position designation, such as printing on two positions.

If it is predetermined that the print position instruction dot code is printed on a pre-selected position, e.g. an edge portion of the medium, the step of instructing the print position through the print-position user setting unit 188 may be omitted.

[14th Embodiment]

A 14th embodiment of the present invention will now be described. In this embodiment, actual printing is performed after the result of synthesis of the dot code and print information is confirmed.

Figure 44:
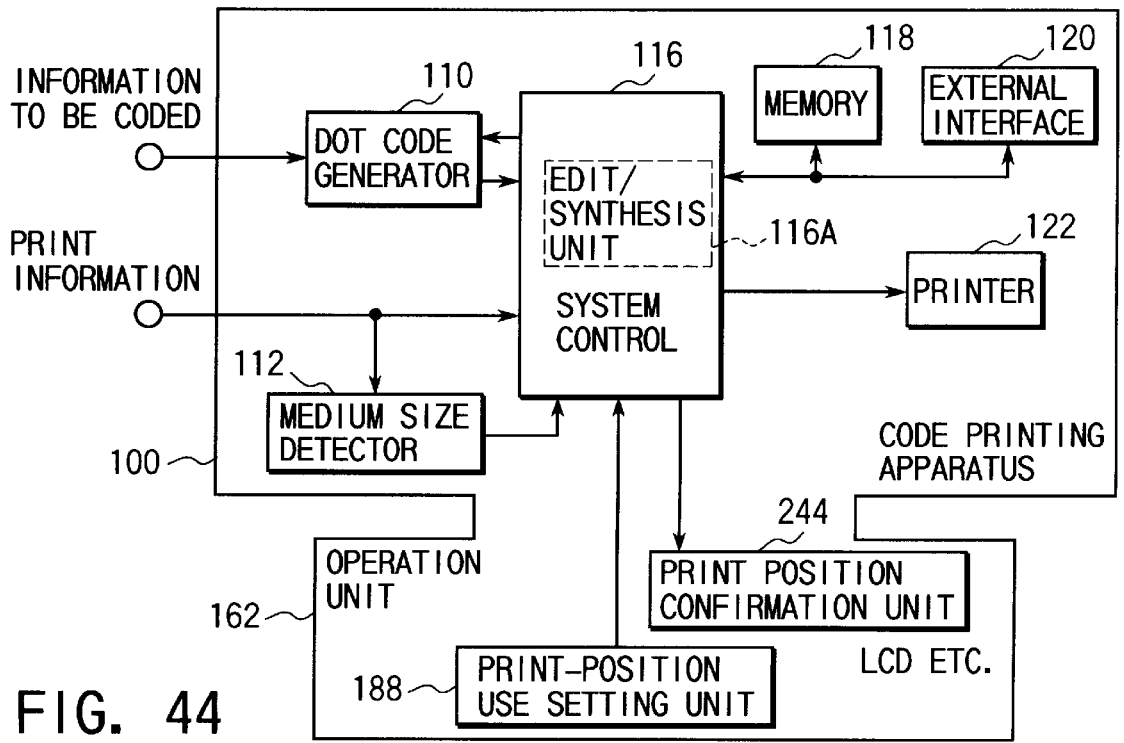
FIG. 44 is a block diagram showing a code printing apparatus according to a 14th embodiment of the present invention.

FIG. 44 is a block diagram showing the structure of the 14th embodiment. The structural elements common to those in FIG. 22 relating to the ninth embodiment are denoted by like reference numerals. Specifically, in the code printing apparatus of the 14th embodiment, a print position confirmation unit 244 is added to the structure of the ninth embodiment.

Figure 45:
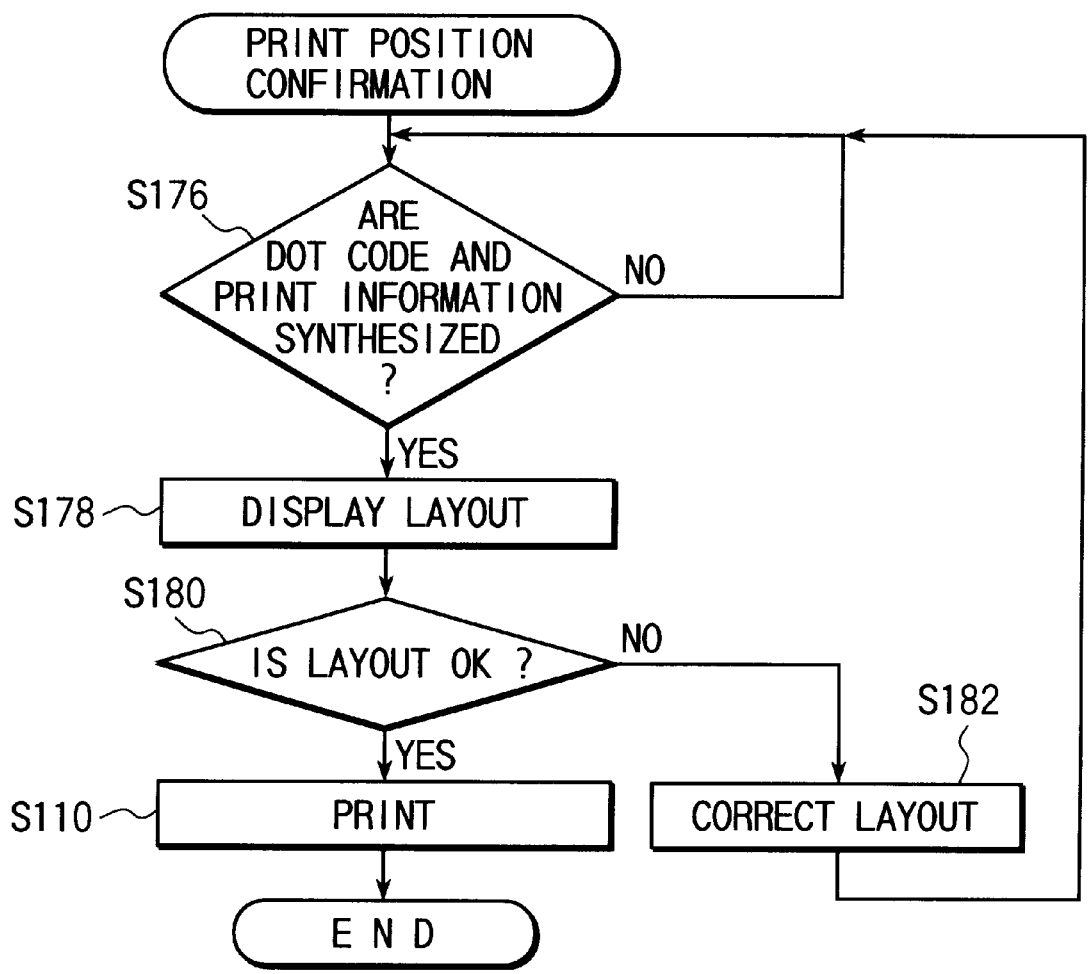
FIG. 45 is a flow chart illustrating the operation of a code printing apparatus according to the 14th embodiment of the invention.

FIG. 45 is a flow chart illustrating the operation of the 14th embodiment. It is confirmed in step S176 whether the synthesis of the dot code and print information in step S118 in FIG. 23 of the ninth embodiment has been completed. If the synthesis is completed, the layout of the synthesized information is displayed on the print position confirmation unit 244 (step S178) It is then confirmed whether "layout OK" is input from the print-position user setting unit 188 (step S180). If the layout is OK, the control goes to step S110 and the synthesized data is printed out.

On the other hand, if the user considers the layout undesirable, the layout is corrected through the print-position user setting unit 188 (step S182). Then, the control returns to step S176 and the synthesizing process is repeated in accordance with the correction result.

With the above-described layout confirmation function, the dot code can be printed, as the user desires.

The present invention has been described on the basis of the various embodiments. However, this invention is not limited to the above embodiments. The present invention can be variously modified or applied, without departing from the spirit of the invention. The subject matter of the present invention may be summarized as follows.

(1) A code printing apparatus comprising:
  input means for inputting multimedia information including at least one of audio information, video information and digital code data;
  code image generating means for converting the multimedia information input by the input means to an optically readable code image;
  printing means for optically readably printing the code image, generated by the code image generating means, on a predetermined print medium; and
  print position setting means for setting a print position of the code image on the print medium, which code image is to be printed by the printing means.

Specifically, information other than a code image such as a character or a picture, and multimedia information in the form of a code image can be efficiently arranged and printed on a print medium.

(2) The apparatus according to above item (1), wherein the print position setting means includes fixed position setting means for setting the print position of the code image at a pre-fixed position on the print medium.

Specifically, since a code image position is designated in advance, arrangement of information other than the code image can be easily determined.

(3) The apparatus according to above item (2), further comprising:
  editing means for editing information other than the code image, such as a document on the print medium,
  wherein the fixed position setting means includes overlap detection means for detecting an overlap state between the code image and the information other than the code image on the print medium, when the print position of the code image is set at the pre-fixed position on the print medium, and
  the editing means edits the information other than the code image, in accordance with a detection result obtained by the overlap detection means.

Specifically, the information other than the code image on the print medium does not overlap the code image. Thus, exact code image printing is achieved, and inconvenience in a subsequent reading operation can be prevented. The user can print information, without the need to consider arrangement of the information other than the code image and the code image.

(4) The apparatus according to above item (3), wherein a process by the editing means for editing the information other than the code image is a process of changing a layout of the other information on the print medium.

Specifically, the information other than the code image on the print medium does not overlap the code image. Thus, exact code image printing is achieved. The user can print information, without the need to consider arrangement of the information other than the code image and the code image.

(5) The apparatus according to above item (3), wherein a process by the editing means for editing the information other than the code image is a process of reducing the other information.

Specifically, the information other than the code image on the print medium does not overlap the code image. Thus, exact code image printing is achieved. The user can print information, without the need to consider arrangement of the information other than the code image and the code image.

(6) The apparatus according to above item (3), wherein a process by the editing means for editing the information other than the code image is a process of prohibiting the other information from being printed on the print medium and issuing an alarm.

Specifically, the information other than the code image on the print medium does not overlap the code image. Since the printing of the other information is prohibited, the user can confirm the presence of inconvenience.

(7) The apparatus according to above item (2), wherein the fixed position setting means includes means for setting the print position of the code image at a plurality of pre-fixed positions on the print medium, and
  the printing means prints the code image of the same multimedia information at the plurality of positions on the print medium.

Specifically, even if there is a factor to degrade the code image, such as a stain or a flaw, exact information reproduction is ensured by virtue of the presence of an alternative code image with the same content.

(8) The apparatus according to above item (1), further comprising:
  peripheral area detection means for detecting a peripheral blank area on the print medium,
  wherein the print position setting means includes peripheral area setting means for setting the print position of the code image at a peripheral area detected by the peripheral area detection means.

Specifically, information other than a code image such as a character or a picture, and multimedia information in the form of a code image can be efficiently arranged and printed on a print medium. The user can print information, without the need to consider arrangement of the code image.

(9) The apparatus according to above item (8), further comprising:
  print position selection means for selecting one of vertical and horizontal directions as a print direction of the code image on the print medium,
  wherein the peripheral area setting means includes means for setting the print position of the code image at one of peripheral areas detected by the peripheral area setting means in accordance with the print position selected by the print position selection means.

Specifically, the user can perform exact code image printing, while recognizing vertical or horizontal printing. Thus, such an undesirable situation can be prevented from arising, wherein the direction of characters or a picture differs from the scan direction of the code image.

(10) The apparatus according to above item (8), further comprising:
  print direction detection means for detecting a direction in which the code image is to be printed, on the basis of the information other than the code image, such as a document, on the print medium,
  wherein the peripheral area setting means includes means for setting the print position of the code image at one of peripheral areas detected by the peripheral area setting means in accordance with the print direction detected by the print direction detection means.

Specifically, information other than a code image such as a character or a picture, and multimedia information in the form of a code image can be efficiently arranged and printed on a print medium. The user can print information, without the need to consider arrangement of the code image.

(11) The apparatus according to above item (8), further comprising:
  data amount calculation means for calculating the total data amount of the code image to which the multimedia input from the input means has been converted,
  wherein the peripheral area setting means includes means for setting the print position of the code image at one of peripheral areas detected by the peripheral area setting means in accordance with the total data amount calculated by the data amount calculation means.

Specifically, an area on the print medium can be efficiently used by altering the print position on the basis of the code image information amount. In addition, the user can print information, without the need to consider arrangement of the information other than the code image and the code image.

(12) The apparatus according to above item (11), wherein the print position setting means includes means for issuing an alarm when none of the peripheral areas detected by the peripheral area setting means cannot be set as the print area in accordance with the total data amount calculated by the data amount calculation means.

The user can recognize such a problem that the code image cannot be printed, before starting printing on the print medium.

(13) The apparatus according to above item (1), further comprising:

input data amount setting means for setting a data amount of input data of multimedia information input by the input means; and data amount calculation means for calculating the total data amount of the code image to which the multimedia input from the input means has been converted, wherein the print position setting means includes means for issuing an alarm when the total data amount calculated by the data amount calculation means is determined to exceed the input data amount set by the input data amount setting means.

Specifically, the user can input multimedia information while recognizing the print position. Thus, the user can recognize such a problem that the code image cannot be printed, before starting printing on the print medium.

(14) The apparatus according to above item (1), wherein the print position setting means includes code print position designation means for inputting and designating the print position of the code image on the print medium.

Specifically, the user can set the print position of the code image according to his/her wish. Thus, the code image can be printed on the basis of a desired layout.

(15) The apparatus according to above item (14), wherein the code print position designation means includes input operation units, provided in association with a plurality of predetermined print positions on the print medium, each of the input operation units selecting a desired one of the print positions.

Specifically, the user can set the print position of the code image according to his/her wish. Thus, the code image can be printed on the basis of a desired layout.

In addition, the print position can be easily set.

(16) The apparatus according to above item (14), further comprising:

display means for visibly displaying one of a print position and a possible print position of the code image on the print medium, wherein the code print position designation means includes means for designating and inputting the possible print position of the code image on a display screen of the display means.

Specifically, the user can set the print position of the code image according to his/her wish. Thus, the code image can be printed on the basis of a desired layout. In addition, because of the user's easier recognition, the user interface is enhanced.

(17) The apparatus according to above item (14), wherein the code print position designation means includes:

possible print position detection means for detecting a possible position on the print medium, at which the code image is to be printed; and position designation means for designating a print position of the code image on the print medium on the basis of the possible print position detected by the possible print position detection means.

Specifically, the user can set the print position of the code image according to his/her wish. Thus, the code image can be printed on the basis of a desired layout. In addition, the print position can be easily set.

(18) The apparatus according to above item (17), wherein the code printing apparatus can use a print position designation sample medium which is equivalent to the print medium and is used to designate the print position of the code image on the print medium, the possible print position detection means includes a mark read means for reading a print position designation mark formed on the print position designation sample medium, and the position designation means designates the print position of the code image on the print medium on the basis of the position of the mark read by the mark read means.

Specifically, the user can set the print position of the code image according to his/her wish. Thus, the code image can be printed on the basis of a desired layout. In addition, the print position can be easily set.

(19) The apparatus according to above item (17), wherein the code printing apparatus can use a print position designation sample medium which is equivalent to the print medium and is used to designate the print position of the code image on the print medium, the possible print position detection means includes a seal read means for reading a print position designation seal removably attached to one of the print position designation sample medium and the print medium, and the position designation means designates the print position of the code image on the print medium on the basis of the position of the seal read by the seal read means.

Specifically, the user can set the print position of the code image according to his/her wish. Thus, the code image can be printed on the basis of a desired layout. In addition, the print position can be easily set. Besides, since the seal is removable, it can be used several times and wasteful use of the seal can be prevented.

(20) The apparatus according to above item (17), wherein the possible print position detection means includes mark read means for reading a specific mark for code print position designation, and the position designation means designates the print position of the code image on the print medium on the basis of the position of the mark read by the mark read means.

Specifically, the user can print the code image and other information without designating the position of the code image.

(21) The apparatus according to above item (20), wherein the specific mark formed on the print medium is formed by using a part of the code image.

Specifically, the structure for code image reproduction is applicable to the detection of the mark, and circuit elements can be commonly used.

(22) The apparatus according to above item (17), wherein the possible print position detection means includes blank area detection means for detecting a blank area on the print medium, and the position designation means designates the print position of the code image on the print medium on the basis of the blank area detected by the blank area detection means.

Specifically, since the code image is printed on a blank portion of the print medium, the print area on the print medium can be efficiently used.

(23) The apparatus according to above item (17), wherein the possible print position detection means includes read means for reading instruction information for instructing the print position of the code image on the print medium, the instruction information being formed on the printing medium, and the position designation means designates the print position of the code image on the print medium on the basis of the instruction information read by the read means.

Specifically, exact code image printing can be performed on the basis of the print position instruction information, without the user's operation.

(24) A code print medium applied to a code printing apparatus comprising: input means for inputting multimedia information including at least one of audio information, video information and digital code data; code image generating means for converting the multimedia information input by the input means to an optically readable code image; printing means for optically readably printing the code image, generated by the code image generating means, on a predetermined print medium; and print position setting means for setting a print position of the code image on the print medium, which code image is to be printed by the printing means, the medium comprising:

a code image print area which is to be set by the print position setting means on the print medium; and instruction information for instructing a position of the code image print area.

Specifically, there is provided a print medium which enables exact code image printing to be performed without the user's operation.

(25) The medium according to above item (24), wherein the instruction information is formed in advance on an edge portion of the print medium.

Specifically, there is provided a print medium which enables exact code image printing to be performed without the user's operation. In addition, since the print position of the instruction information is determined, the instruction information can be read immediately.

(26) The medium according to above item (24), wherein the instruction information is information in the form of a code image printed in advance on an edge portion of the print medium.

Specifically, exact code image printing can be performed without the user's operation. In addition, since the print position of the instruction information is determined, the instruction information can be read immediately. Furthermore, the instruction information is in the form of the code image, complex print position designation can be carried out. For example, two print positions can be set.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A code printing apparatus comprising:

input means for inputting multimedia information including at least one of audio information, video information and digital code data;

code image generating means for converting the multimedia information input by said input means into an optically readable code image;

printing means for printing the code image on a predetermined print medium;

print position setting means for setting a print position of the code image on the print medium;

data amount setting means for setting a print data amount of information which is printable as the code image at the print position set by said print position setting means;

data amount detection means for detecting an input data amount of the multimedia information input by said input means;

judging means for judging whether or not the multimedia information input by said input means is printable as the code image at the print position set by said print position setting means, based on a comparison between the print data amount set by said data amount setting means and the input data amount detected by said data amount detection means, before the multimedia information is converted into the code image by the code image generating means.

2. The apparatus according to claim 1, wherein said print data amount comprises a data length.

3. The apparatus according to claim 1, wherein said print position setting means sets a plurality of print positions, and said data amount setting means sets the print data amount with respect to a given one of the plurality of print positions at which a largest data amount is printable.

4. The apparatus according to claim 1, wherein said print position setting means includes fixed position setting means for setting the print position of the code image at a pre-fixed position on the print medium.

5. The apparatus according to claim 4, further comprising:

editing means for editing information other than the code image on the print medium, wherein said fixed position setting means includes overlap detection means for detecting an overlap state between the code image and said other information on the print medium when the print position of the code image is set at the pre-fixed position on the print medium, and wherein said editing means edits said other information in accordance with a detection result obtained by said overlap detection means.

6. The apparatus according to claim 5, wherein said editing means comprises means for changing a layout of said other information on the print medium.

7. The apparatus according to claim 5, wherein said editing means comprises means for reducing said other information.

8. The apparatus according to claim 5, wherein said editing means comprises means for issuing an alarm in accordance with a detection result obtained by said overlap detection means.

9. The apparatus according to claim 4, wherein said fixed position setting means sets the print position of the code image at a plurality of pre-fixed positions on the print medium.

10. The apparatus according to claim 1, wherein said print position setting means includes code print position designation means for inputting and designating the print position of the code image on the print medium.

11. The apparatus according to claim 10, wherein said code print position designation means comprises a plurality of input operation units for respectively selecting desired ones of a plurality of predetermined print positions set on the print medium.

12. The apparatus according to claim 10 further comprising:
- a display for visibly displaying one of a position where the code image is to be printed on the print medium and a position where the code image has been printed on the print medium, and
- wherein said code print position designation means comprises a display screen on which the position where the code image is to be printed on the print medium is input and designated.

13. The apparatus according to claim 1, wherein said code image comprises a plurality of blocks, and each block comprises:
- data dots arranged in accordance with data of the multimedia information;
- a marker which serves as a reference for reading said data dots; and
- a block address for representing an address of each block.

14. The apparatus according to claim 1, further comprising means for issuing an alarm when said judging means judges that the multimedia information input by said input means is not printable as the code image at the print position set by said print position setting means.

* * * * *